ns100894825082

(12) United States Patent
Kalva et al.

(10) Patent No.: US 8,948,250 B2
(45) Date of Patent: *Feb. 3, 2015

(54) SYSTEMS AND METHODS FOR VIDEO/MULTIMEDIA RENDERING, COMPOSITION, AND USER-INTERACTIVITY

(71) Applicant: Intel Corporation, Santa Clara, CA (US)

(72) Inventors: Hari Kalva, Delray Beach, FL (US); Atul Puri, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/972,013

(22) Filed: Aug. 21, 2013

(65) Prior Publication Data

US 2014/0028721 A1 Jan. 30, 2014

Related U.S. Application Data

(63) Continuation of application No. 13/742,523, filed on Jan. 16, 2013, now Pat. No. 8,782,713, which is a continuation of application No. 12/586,057, filed on Sep. 16, 2009, now Pat. No. 8,363,716.

(60) Provisional application No. 61/192,136, filed on Sep. 16, 2008.

(51) Int. Cl.
*H04N 11/02* (2006.01)
*G06F 3/048* (2013.01)
(Continued)

(52) U.S. Cl.
CPC ....... *H04N 21/4722* (2013.01); *H04N 21/4728* (2013.01); *H04N 21/23412* (2013.01);
(Continued)

(58) Field of Classification Search
CPC . H04N 7/50; H04N 7/17318; H04N 21/4722; G09G 5/14

USPC .......... 375/240.01, 240.12; 715/790; 725/60, 725/61
See application file for complete search history.

(56) References Cited

U.S. PATENT DOCUMENTS 7,860,309 B1 12/2010 Bodnar et al.
7,893,999 B2 2/2011 Bennett
(Continued)

FOREIGN PATENT DOCUMENTS

EP 1 204 277 A2 5/2002
EP 1 684 517 A2 7/2006
(Continued)

OTHER PUBLICATIONS

Final Office Action received for U.S. Appl. No. 12/586,057, mailed on Aug. 17, 2012, 19 pages.
(Continued)

*Primary Examiner* — Hoang-Vu A Nguyen-Ba
(74) *Attorney, Agent, or Firm* — Stoel Rives LLP

(57) ABSTRACT

An interactive video/multimedia application (IVM application) may specify one or more media assets for playback. The IVM application may define the rendering, composition, and interactivity of one or more the assets, such as video. Video multimedia application data (IVMA data may) be used to define the behavior of the IVM application. The IVMA data may be embodied as a standalone file in a text or binary, compressed format. Alternatively, the IVMA data may be embedded within other media content. A video asset used in the IVM application may include embedded, content-aware metadata that is tightly coupled to the asset. The IVM application may reference the content-aware metadata embedded within the asset to define the rendering and composition of application display elements and user-interactivity features. The interactive video/multimedia application (defined by the video and multimedia application data) may be presented to a viewer in a player application.

20 Claims, 13 Drawing Sheets

(51) Int. Cl.

| | |
|---|---|
| *H04N 5/445* | (2011.01) |
| *H04N 7/173* | (2011.01) |
| *H04N 21/4722* | (2011.01) |
| *H04N 21/4728* | (2011.01) |
| *H04N 21/234* | (2011.01) |
| *H04N 21/44* | (2011.01) |
| *H04N 21/472* | (2011.01) |
| *H04N 21/8543* | (2011.01) |
| *H04N 21/8545* | (2011.01) |
| *H04N 21/4725* | (2011.01) |
| *G06T 5/50* | (2006.01) |
| *G06F 3/0481* | (2013.01) |
| *H04N 5/45* | (2011.01) |
| *H04N 19/61* | (2014.01) |
| *H04N 11/04* | (2006.01) |
| *G06F 3/00* | (2006.01) |
| *G06F 13/00* | (2006.01) |
| *H04L 12/801* | (2013.01) |

(52) U.S. Cl.
CPC . *H04N21/234218* (2013.01); *H04N 21/44012* (2013.01); *H04N 21/47205* (2013.01); *H04N 21/8543* (2013.01); *H04N 21/8545* (2013.01); *H04N 21/4725* (2013.01); *G06T 5/50* (2013.01); *G06F 3/0481* (2013.01); *H04L 47/10* (2013.01); *H04N 5/45* (2013.01); *H04N 7/50* (2013.01)
USPC ............. 375/240.01; 375/240.12; 715/790; 725/60; 725/51; 725/109; 725/112; 725/113

(56) References Cited

U.S. PATENT DOCUMENTS

| | | | | |
|---|---|---|---|---|
| 7,953,315 | B2 * | 5/2011 | Bennett | 386/353 |
| 8,351,513 | B2 | 1/2013 | Wen et al. | |
| 8,363,716 | B2 | 1/2013 | Kalva et al. | |
| 2002/0184648 | A1 * | 12/2002 | Delpuch | 725/112 |
| 2003/0235341 | A1 * | 12/2003 | Gokturk et al. | 382/243 |
| 2004/0068758 | A1 | 4/2004 | Daily et al. | |
| 2006/0028488 | A1 * | 2/2006 | Gabay et al. | 345/626 |
| 2007/0230658 | A1 | 10/2007 | Okada et al. | |
| 2008/0018784 | A1 | 1/2008 | Bennett | |
| 2008/0129844 | A1 | 6/2008 | Cusack et al. | |
| 2008/0141307 | A1 | 6/2008 | Whitehead | |
| 2008/0165861 | A1 | 7/2008 | Wen et al. | |
| 2008/0247462 | A1 * | 10/2008 | Demos | 375/240.03 |
| 2008/0295129 | A1 * | 11/2008 | Laut | 725/34 |
| 2008/0317378 | A1 | 12/2008 | Steinberg et al. | |
| 2008/0317379 | A1 | 12/2008 | Steinberg et al. | |
| 2009/0003708 | A1 * | 1/2009 | Steinberg et al. | 382/190 |
| 2009/0066784 | A1 * | 3/2009 | Stone et al. | 348/47 |
| 2009/0097568 | A1 * | 4/2009 | Karczewicz et al. | 375/240.24 |
| 2009/0284601 | A1 | 11/2009 | Eledath et al. | |
| 2009/0307258 | A1 | 12/2009 | Priyadarshi et al. | |
| 2010/0026712 | A1 * | 2/2010 | Aliprandi et al. | 345/629 |
| 2010/0034425 | A1 | 2/2010 | Lin et al. | |
| 2010/0156916 | A1 * | 6/2010 | Muikaichi et al. | 345/536 |
| 2012/0201306 | A1 | 8/2012 | Kang et al. | |
| 2013/0080868 | A1 * | 3/2013 | Raichelgauz et al. | 715/205 |
| 2013/0166580 | A1 * | 6/2013 | Maharajh et al. | 707/758 |
| 2013/0227616 | A1 | 8/2013 | Kalva et al. | |

FOREIGN PATENT DOCUMENTS

| | | | |
|---|---|---|---|
| KR | 10-2006-0081375 | A | 7/2006 |
| WO | 02/05089 | A1 | 1/2002 |
| WO | 2010/033642 | A2 | 3/2010 |
| WO | 2010/033642 | A3 | 7/2010 |

OTHER PUBLICATIONS

Non-Final Office Action received for U.S. Appl. No. 12/586,057, mailed on Dec. 15, 2011, 20 pages.
Non-Final Office action received for U.S. Appl. No. 13/742,523, mailed on Oct. 28, 2013, 13 pages.
International Preliminary Report on Patentability received for PCT Patent Application No. PCT/US2009/057219, mailed on Mar. 22, 2011, 5 pages.
International Search Report and Written Opinion received for PCT Patent Application No. PCT/US2009/057219, mailed on May 3, 2010, 7 pages.
Notice of Allowance received for U.S. Appl. No. 13/742,523, mailed on Apr. 3, 2014, 7 pages.

* cited by examiner

SYSTEMS AND METHODS FOR VIDEO/MULTIMEDIA RENDERING, COMPOSITION, AND USER-INTERACTIVITY

CROSS-REFERENCE TO RELATED APPLICATIONS

This application is a continuation of U.S. patent application Ser. No. 13/742,523, filed Jan. 16, 2013, titled "SYSTEMS AND METHODS FOR VIDEO/MULTIMEDIA RENDERING, COMPOSITION, AND USER-INTERACTIVITY," which is a continuation of U.S. patent application Ser. No. 12/586,057, filed Sep. 16, 2009, titled "SYSTEMS AND METHODS FOR MULTIMEDIA RENDERING, COMPOSITION, AND USER-INTERACTIVITY," now issued as U.S. Pat. No. 8,363,716, which claims the benefit of U.S. Provisional Application No. 61/192,136, filed Sep. 16, 2008, titled "SYSTEMS AND METHODS FOR ADVANCED INTERACTIVE VIDEO/MULTIMEDIA," each of which is hereby incorporated by reference herein in its entirety.

DETAILED DESCRIPTION

Figure 1A:
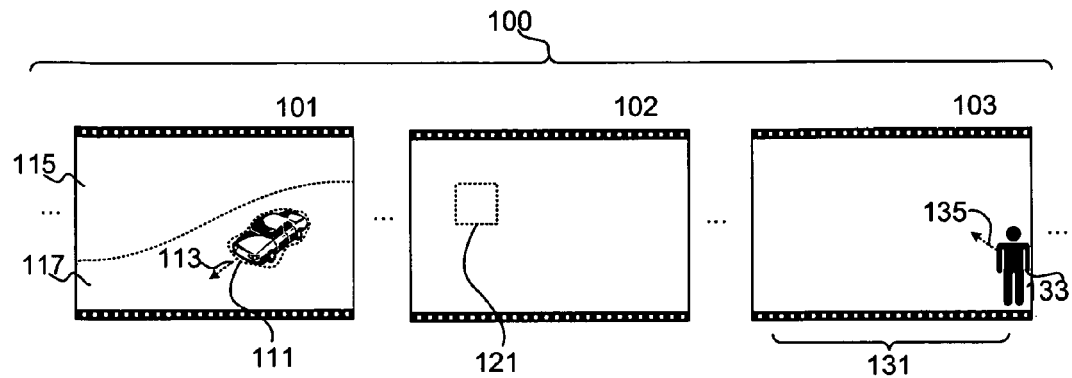
FIG. 1A depicts one example of video content comprising content-aware metadata.

Video or other multimedia assets may be "tightly coupled" to information that describes the asset (referred to herein as "content-aware" metadata). As used herein, content-aware metadata may refer to information that describes or identifies a video content feature, including, but not limited to: a region of interest (ROI) within the video content (e.g., a particular portion or encoding aspect of a video display region, one or more video frames, etc.), an object within the content (e.g., shape, color region, etc.), motion characteristics of video objects (e.g., local motion vectors of a shape within the video content), regions having a particular color, text displayed within or otherwise obtained from the video (e.g., as a graphical element of the video, as sub-title information, menu items, text obtained from or by processing an audio track, or the like), shape, edge or other identifying characteristic, scene change information, scene fingerprint, scene complexity, identification of background and foreground regions, texture descriptors, and the like. In some embodiments, features identified and/or described by content-aware metadata may be generally referred to as a ROI and/or an "object." Content-aware metadata may be embodied as text data (e.g., UTF-8 encoded strings), formatted data (e.g., XML), compressed binary data, or the like.

The content-aware metadata may be tightly-coupled to the video content. As used herein, a tight coupling between content-aware metadata and video content may refer to association between metadata and an encoded and/or compressed video bitstream. The association may be at the encoding and/or compression level and may be maintained through rendering and/or playback. In some embodiments, content-aware metadata may be embedded within a bitstream comprising the encoded video content (e.g., according to a bitstream syntax). The content-aware metadata may be tightly-coupled to the video content in other ways. In some embodiments, a video codec or video bitstream may be adapted to include content-aware metadata. One example of such a codec is the Next Generation Video (NGV) codec developed by RealNetworks, Inc., which may use content analysis to improve content encoding, compression, scalability, and user-interaction. Information determined using content analysis (e.g., shape detection, motion detection, etc.) may be leveraged to produce content-aware metadata describing the encoded video content. The production of content-aware metadata may be driven by automated processes (e.g., machine vision, metadata coding conditions (discussed below), or the like) and/or may be driven by human interaction (user-selected and/or identified content-aware metadata).

The content-aware metadata may be embedded into video content as the video is encoded and/or compressed. The content-aware metadata may be extracted as the video content is subsequently decoded and/or decompressed for playback. Since the metadata is tightly-coupled with the video content at the encoding/compression level, the tight association therebetween may be maintained regardless of the mechanism used to playback the encoded video (e.g., independent of network lag, buffering requirements, user interactions, playback performance, player processing resources, and the like). Similarly, the tight-coupling may be maintained despite changes to the playback caused by user interaction or the like (e.g., pausing video playback, fast forward, chapter skip, channel change, etc.). The tight-coupling described above may allow content-aware metadata to be associated with the video content at the frame, scene, and/or video object level.

The tight coupling may be maintained by the renderer used to prepare the decoded video for playback. The renderer (such as the IVM Application Components Renderer and Compositor 365 and/or 565 discussed below) may maintain the synchronism between the decoding and/or decompression of the encoded video content and the extracted content-aware metadata. The synchronism between the renderer and the decoder and/or content-aware metadata extraction modules may allow the tight coupling therebetween to be maintained.

In some embodiments, content-aware metadata may be identified and/or embedded by a video encoder. Encoding and/or compression may include identifying features related to the content, such as shape identification, motion vectors, scene identification, object identification, and so on. These features may be used to encode and/or compress the video content. The features may also be used as content-aware metadata. For example, a video encoder may be configured to segment a scene or frame of video content into one or more region layers. A region layer may be assigned various properties, including, but not limited to: region color, texture, motion, location (within one or more frames), shape, and the like. Each region may be assigned an identifier. The region layers (as well as their associated properties) may be made available by the encoder as content-aware metadata.

Alternatively, or in addition, content-aware metadata may be added by another automated processes (e.g., a process other than a video encoder), such as, for example, a machine vision process or the like. For example, video content may be processed to automatically identify human faces within the content, identify particular shapes or patterns in a scene (e.g., identify the cars in a scene, edges), track or identify particular colors, identify and/or parse text appearing in the content, identify encoding characteristics of the encoded video and audio, identify graphical features corresponding to external objects, and so on.

Content-aware metadata may be added by a human operator. For example, a human operator may view the video content (e.g., during encoding or a preprocessing step) and identify one or more regions of interest therein. For example, a human operator may identify a break in the action of a soccer game or an "offensive" scene (e.g., a scene showing excessive violence, sexual content, or the like). The operator may cause content-aware metadata identifying the ROI (e.g., identifying one or more frames that mark the beginning and/or end ROI in the video) to be embedded within the encoded video content. As will be described below, the operator (or other entity) may reference the embedded content-aware metadata to control the behavior of an interactive video/multimedia application (discussed below). For example, during the identified break in the action of a soccer game, the user may cause an advertising image to be displayed (one example of such an advertising multimedia element is described below in conjunction with FIGS. 13A-13C). In another example, the user may cause an offensive scene in the video (as identified by the embedded content-aware metadata) to be skipped, and so on.

FIG. 1A depicts one example of encoded video content comprising content-aware metadata. The encoded video content 100 may include data representing a plurality of video scenes or segments 101, 102, and 103. During playback, each segment 101, 102, and 103 may result in the display of a plurality of video frames. The encoded video content 100 may include content-aware metadata describing the segments 101, 102, and/or 103. The content-aware metadata may be embedded within the encoded video content 100 (e.g., included as part of the video content bitstream or other data structure embodying the encoded video content 100). Accordingly, the content-aware metadata (metadata entries 111, 113, 115, 117, 121, 131, 133, and 135, the "FIG. 1A metadata" hereafter) may be tightly coupled to the encoded video 100 to provide for metadata-to-content synchronization that is independent of playback performance (e.g., buffering, etc.), playback timing, user interaction, and the like.

In the FIG. 1A example, content-aware metadata 111 may identify a region of interest (e.g., a racecar) within the segment 101. The content-aware, ROI metadata 111 may define an ROI with bounds of the racecar shape; determine the position of the shape within various frames of the segment 101, and the like. In some embodiments, the metadata 111 (or additional content-aware metadata 113) may specify local motion vector(s) of the ROI. In addition, metadata may identify a background region 115, and a foreground region 117 of the segment 101. For scenes comprising additional detail, additional background and foreground layers may be specified (e.g., in metadata describing a z-buffer data structure or the like). Additional metadata (not shown) may provide additional information about the scene 101, such as the color and/or texture of various scene elements (e.g., the racecar shape), a model of the shape (in 2-D or 3-D), or the like. For example, a 3-D model of the ROI 111 may allow additional multimedia elements (e.g., advertising images) to be properly overlaid on the racecar identified thereby.

Content-aware metadata 121 may specify an ROI within the scene 102. The ROI metadata 121 may correspond to a shape (not shown) or other feature of the segment 102 (e.g., a foreground region, a background region, a color region, or the like). The ROI metadata 121 may be determined using an automated, machine-learning technique, such as pattern matching, template matching, optical character recognition (OCR), or the like. Alternatively, or in addition, video encoding and compression techniques may be used, such as shape identification, motion vector estimation, and the like. As will be discussed below, an ROI may be selectable by a user (e.g., as a hotspot), to allow for user interaction with the segment 102. The ROI metadata 121 may include bounding, position, and/or local motion information.

In the segment 103, content-aware metadata 131 may identify a ROI comprising one or more encoded video frames within the segment 103. As used in this context, the ROI metadata 131 may specify a time segment of the video content and/or a particular set of video frames as opposed to a region within a video display area. As will be discussed below, time- or frame-related ROI content-aware metadata may be used to trigger events, such as the display of additional multimedia elements and/or user-interaction components (e.g., trigger the display of additional multimedia elements, such as text overlays, advertising images, audio content, and the like).

The frames specified by the ROI metadata 131 may correspond to a scene change (e.g., as identified by a compression, encoding, or machine vision operation), a scene fingerprint, or the like. The content-aware metadata 131 may identify a particular set of frames that may be of interest in video content. For example, the ROI identified by the metadata 131 may correspond to advertising insertion (e.g., during a lull in the action of a baseball game, such as the seventh inning stretch), to a particular event occurring in the content (e.g., a player hitting a home run), the entrance of a particular player onto the field, the presence of an object within the field of view (such as a billboard), an offensive scene, or the like. In the FIG. 1A example, the ROI identified by the content-aware metadata 131 identify the time a particular player enters the segment 103. The player may have been identified by an automated technique (e.g., by identifying a color of the player's uniform, uniform markings, such as number and/or name, recognizing facial or other features of the player, and so on). The segment 103 may further include content-aware metadata 133 describing the shape and/or position of the player and/or metadata 135 describing the motion characteristics of the player.

As discussed above, the FIG. 1A metadata may be encoded with the video content 100 (e.g., may be included in the data structure or stream comprising the video 100). Therefore, the content-aware metadata may be tightly coupled to the video stream 100 (coupled to the scenes 101, 102, 103 and/or the frames and/or objects therein) regardless of the transport and/or playback mechanism used to display the encoded video content 100.

Figure 1B:
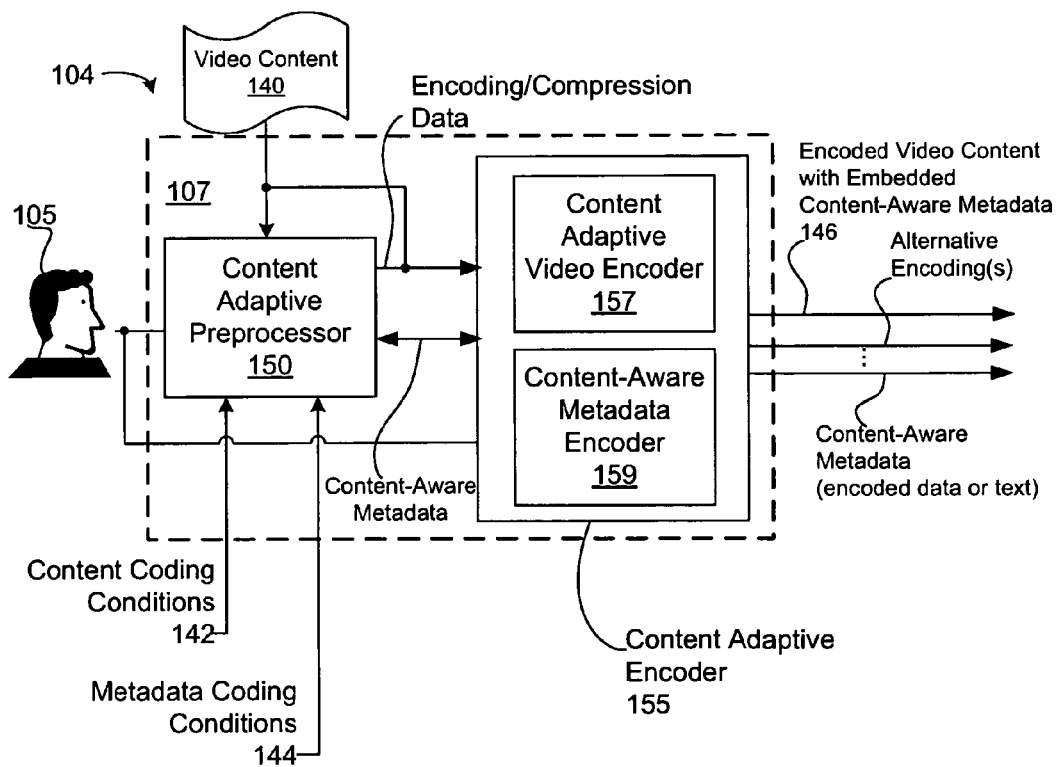
FIG. 1B is a block diagram of one embodiment of an apparatus for embedding content-aware metadata into a video asset.

FIG. 1B is a block diagram of one embodiment of an apparatus configured to encode video content comprising content-aware metadata. The apparatus 104 may be implemented on or in conjunction with one or more computing devices 107. Although not depicted in FIG. 1B, the computing device 107 may comprise a processor, memory, computer-readable storage media, communications interface, input/output devices, and the like.

In some embodiments, the apparatus 104 may be configured to identify and embed content-aware metadata into encoded video content 146. In the FIG. 1B example, a Content Adaptive Preprocessor 150 may be configured to analyze video content 140 for encoding by a Content Adaptive Encoder 155. The Content Adaptive Preprocessor 150 may receive content coding conditions 142, which may specify input resolution, bitrate, frame rate, application dependent quality expectations, quality of service parameters, and the like. The Content Adaptive Preprocessor 150 may use the content coding conditions 142 to determine preprocessing needed for the Content Adaptive Encoder 155. The Content Adaptive Preprocessor 150 may also receive metadata coding conditions 144, which, as will be discussed below, may be used by the preprocessor to identify content-aware metadata within the video content 140. In some embodiments, the content coding conditions 142 and/or the metadata coding conditions 144 may be provided and/or modified by an author 105.

The Content Adaptive Preprocessor 150 may analyze the video content 140 using video compression and/or machine vision techniques, each of which may result in the identification of content-aware metadata. The video compression information may include scene change information, scene complexity information, shape identification, local motion vectors, texture descriptors, region of interest, and the like. In one example, the Content Adaptive Preprocessor 150 and/or the Content Adaptive Encoder 155 may segment video frames and/or scenes into a plurality of region layers, each of which may be assigned respective properties (e.g., color, texture, motion, shape, etc.). The level of detail of the video compression information determined by the Content Adaptive Preprocessor 150 may be determined according to the content coding conditions 142 and/or the metadata coding conditions 144. The video compression information determined by the Content Adaptive Preprocessor 150 may be used by the Content Adaptive Encoder module 155 to encode and/or compress the video content 140. In addition, the video compression information may be included in the encoded video asset as content-aware metadata (e.g., shape and/or color identifiers, motion information, foreground, background identification, and the like).

The Content Adaptive Preprocessor 150 may be further configured to analyze the video content using one or more automated processing techniques, such as pattern matching, template matching, OCR, face identification, and the like. In some embodiments, the machine vision techniques may be seeded by the image compression information. For example, the machine vision techniques may be used to classify a shape identified by an image compression technique (e.g., identify the shape as a racecar and/or as a particular racecar, as a baseball player, and so on). In some embodiments, the machine vision techniques may be supervised by the content metadata coding conditions 144, which may specify how metadata is to be identified. For example, the conditions may specify that human faces in the content be identified, may specify how particular types of objects are to be identified (e.g., how to identify a racecar using a pattern template or other specifier), may specify how specific objects are to be identified (e.g., how to identify members of a particular team by uniform characteristics, team name, or the like), and so on.

Alternatively, or in addition, content-aware metadata may be identified and/or specified by an author 105, who may manually identify shapes, or other regions of interest, within the video content 140. The author 105 may view the video content 140 as it is being encoded. During the viewing, the author 105 may identify one or more regions of interest (or other features) within the video content. For example, the author 105 may identify shapes, or other elements within the video content 140 by selecting shapes or other elements identified by the Content Adaptive Preprocessor 150 or another automated processes. Content-aware metadata identifying the regions of interest selected by the author 105 may be embedded within the encoded video by the Content Adaptive Encoder 155.

The Content Adaptive Encoder 155 receives the video content 140, the encoding and compression data, and the content-aware metadata identified by the Content Adaptive Preprocessor 150. The in FIG. 1B example, the Content Adaptive Encoder 155 may include a Content Aware Video Encoder 157 and a Content-Aware Metadata Encoder 159. The Content Adaptive Video Encoder 157 may compress and/or encode the video content 140 according to the content coding conditions 142. In some embodiments, the Content Adaptive Video Encoder 157 may provide one or more alternative encoding(s), which may comprise alternative encodings of the entire video content 140 and/or portions thereof (e.g., particular regions, segments, or the like). For example, one or more of the alternative encodings may correspond to an ROI identified within the video content 140 (e.g., by the Content Adaptive Preprocessor 150, the metadata coding conditions 142, the author 105, or the like). The ROI may be provided in a higher resolution and/or bitrate than the rest of the encoded content to allow a user to "zoom-in" to the specified ROI. In another example, higher-resolution encodings of certain parts of the video content 140 may be provided (e.g., as identified by an ROI or the like). For instance, the Content Adaptive Video Encoder 157 may generate a higher-resolution encoding of a goal scored in a soccer match, an auto racing crash, or the like. In an embodiment, the Content Adaptive Video Encoder 157 may continuously provide a higher resolution encoding, which higher resolution encoding or a portion thereof is only stored beyond a specified period if the author 105 indicates that it should be.

The compressing and/or encoding implemented by the Content Adaptive Video Encoder 157 may yield additional content-aware metadata, such as global and local motion parameters, region/object shape actually encoded, texture descriptors, etc. In some embodiments, the Content Adaptive Video Encoder 157 may receive the metadata encoding conditions 144 to identify content-aware metadata for inclusion in the encoded content asset.

The Content-Aware Metadata Encoder 159 may be configured to embed the content-aware metadata in the encoded video content 146 (e.g., embed the content-aware metadata in the video bitstream). The embedding may provide for a tight coupling of the encoded video content and the content-aware metadata that is independent of the mechanism used to playback and/or transport the encoded content 146. In some embodiments, the content-aware metadata may be embedded within a bitsream comprising the encoded video content 146 (e.g., according to the bitstream syntax of the encoding). In some embodiments, the codec used to encode the video asset may be adapted to include embedded, content-aware metadata. As discussed above, the NGV codec developed by RealNetworks, Inc. is one example of a video codec configured to embed tightly-coupled, content-aware metadata in encoded and/or compressed video content.

In some embodiments, and as shown in FIG. 1B, the content-aware metadata may be made available as a separate stream or data structure (as encoded data and/or text). The separate content-aware metadata may flow to an indexing and/or search component for use in indexing and/or classifying the encoded video content 146. For example, text content-aware metadata (e.g., identified by an automated machine vision and/or OCR process), may be used to provide for searching within the encoded video content 146. For example, content-aware metadata may identify the names of the players appearing in a baseball game (e.g., using captioning information, uniform labeling, or the like). The content-aware metadata may be used to allow a user or another application or process to search for video content in which a particular player appears. Other metadata, such as color information, shape information, movement, etc. may be used to classify and/or categorize the encoded content 146. For instance, video content comprising a particular shape (e.g., a racecar) may be indexed and/or classified as "racing related," video content comprising a large number of motion vectors may be identified as "action" related, video content having predominantly dark scenes may be identified as "dark," and so on.

Figure 1C:
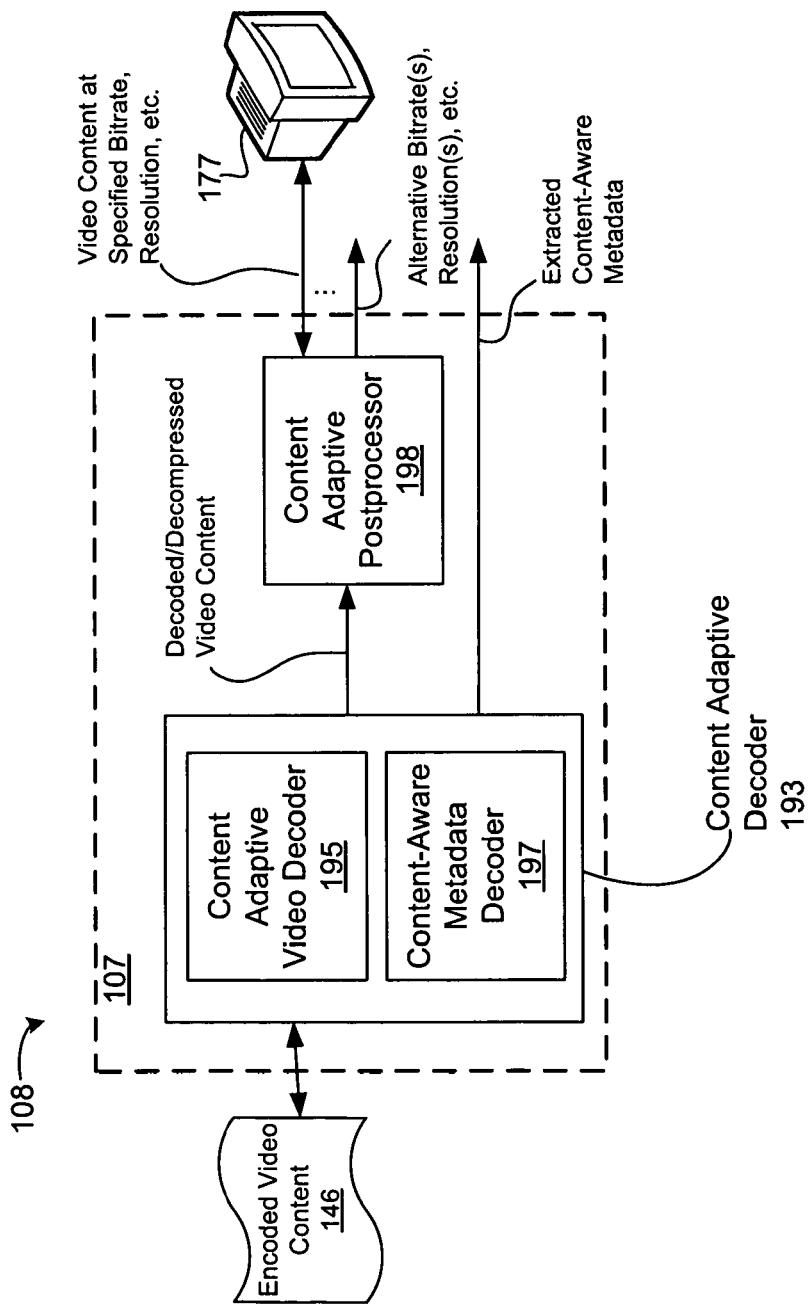
FIG. 1C is a block diagram of one embodiment of an apparatus for decoding a video asset comprising content-aware metadata.

FIG. 1C is a block diagram of an apparatus 108 configured to decode encoded video content comprising content-aware metadata. The apparatus 108 may be implemented on and/or in conjunction with a computing device 107 which, as discussed above, may comprise a processor, memory, computer-readable media, communications interfaces, a human-machine interface (HMI) 177, and the like.

A Content Adaptive Decoder 193 may receive encoded video content 146. A Content Adaptive Video Decoder 195 may be configured to decode and/or decompress the encoded video content 146 for rendering and/or playback. During the decoding, the Content-Aware Metadata Decoder 197 may extract content-aware metadata embedded within the encoded video content 146 (e.g., embedded within the bitstream comprising the encoded video content 146). Since the extraction of content-aware metadata occurs during decoding and/or decompression, the extracted content-aware metadata may be synchronized (tightly coupled) to the decoded video (e.g., as a particular frame or scene is decoded, content-aware metadata describing the frame or scene is extracted). The synchronism between the content-aware metadata and the video frames and/or scenes described thereby may be maintained regardless of the mechanism used to playback, transmit, and/or interact with the encoded video. As discussed above, the tight coupling may be maintained by the use of synchronized rendering and/or playback components (e.g., modules 365 and/or 565 described below).

The decoded and/or decompressed video content may flow to a Content Adaptive Postprocessor 198, which may be configured to select appropriate playback parameters for the decoded video (e.g., video resolution, bitrate, etc.). The Content Adaptive Postprocessor 198 may select the playback parameters according the capabilities of the display device on which the video is to be displayed (e.g., the display device available on the HMI 177). The Content Adaptive Postprocessor 198 may be configured to output alternative bitrate(s) and/or resolution(s) depending upon the capabilities of the HMI 177 (e.g., for picture in picture, zoom, alternative views, etc.).

Figure 5:
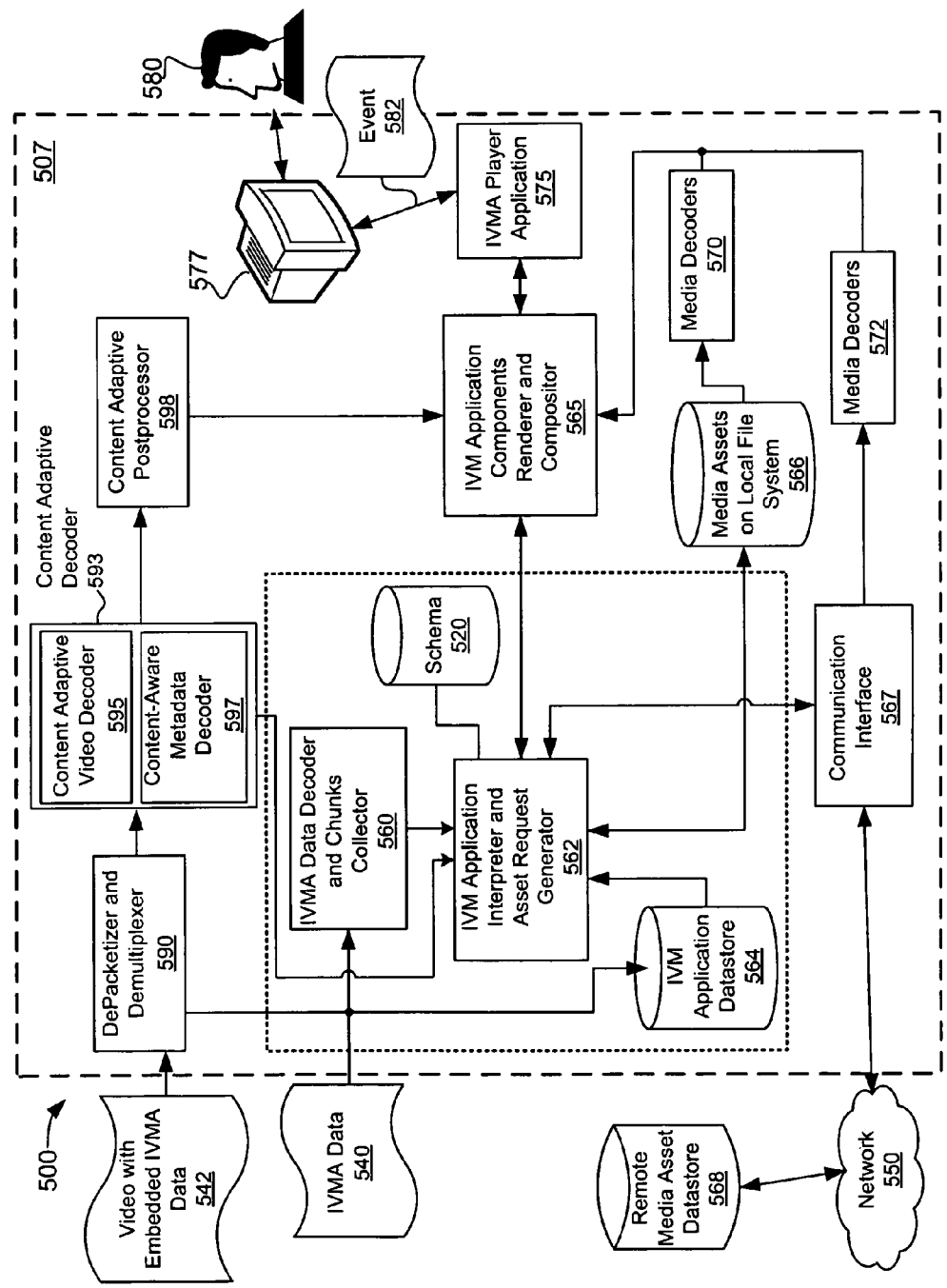
FIG. 5 is a block diagram of another embodiment of an apparatus configured to implement an interactive video/multimedia presentation.

The extracted content-aware metadata may flow into an IVM application for rendering and/or playback (as shown in FIG. 5). Alternatively, or in addition, the extracted content-aware metadata may flow to an indexing service or datastore which may use content-aware metadata to index and/or classify the encoded video content 146 as described above.

The content-aware metadata discussed above may be leveraged to enable interactive video/multimedia applications ("IVM applications" hereafter). An IVM application may be described by interactive video/multimedia application description data ("IVMA data" hereafter). The IVMA data may define the rendering, composition, and user-interactivity features of the IVM application. The rendering, composition, and/or user-interactivity features may be tied to content-aware metadata. For example, the content-aware metadata may define spatio-temporal relationships between multimedia elements in the IVM applications, may define and/or trigger user interactivity features, and so on.

An IVM application may comprise multiple, interactive video/multimedia elements including, but not limited to: video content, audio content, graphical content (e.g., text, images, rendered 2D and/or 3D graphics, etc.), and the like. The multimedia content may be rendered and/or combined in the IVM application in various ways (as specified by the IVMA data). For example, an IVM application may combine multiple content assets using transparency (e.g., an image may be transparently overlaid on a video object), depth mapping (e.g., z-buffering), alpha-blending, clipping, audio mixing, motion animation, and the like. The IVM application may provide for user interaction with various elements defined in the IVM application (e.g., user interaction with regions of interest of video content, objects defined in the video content, user interface components, and the like).

Figure 2:
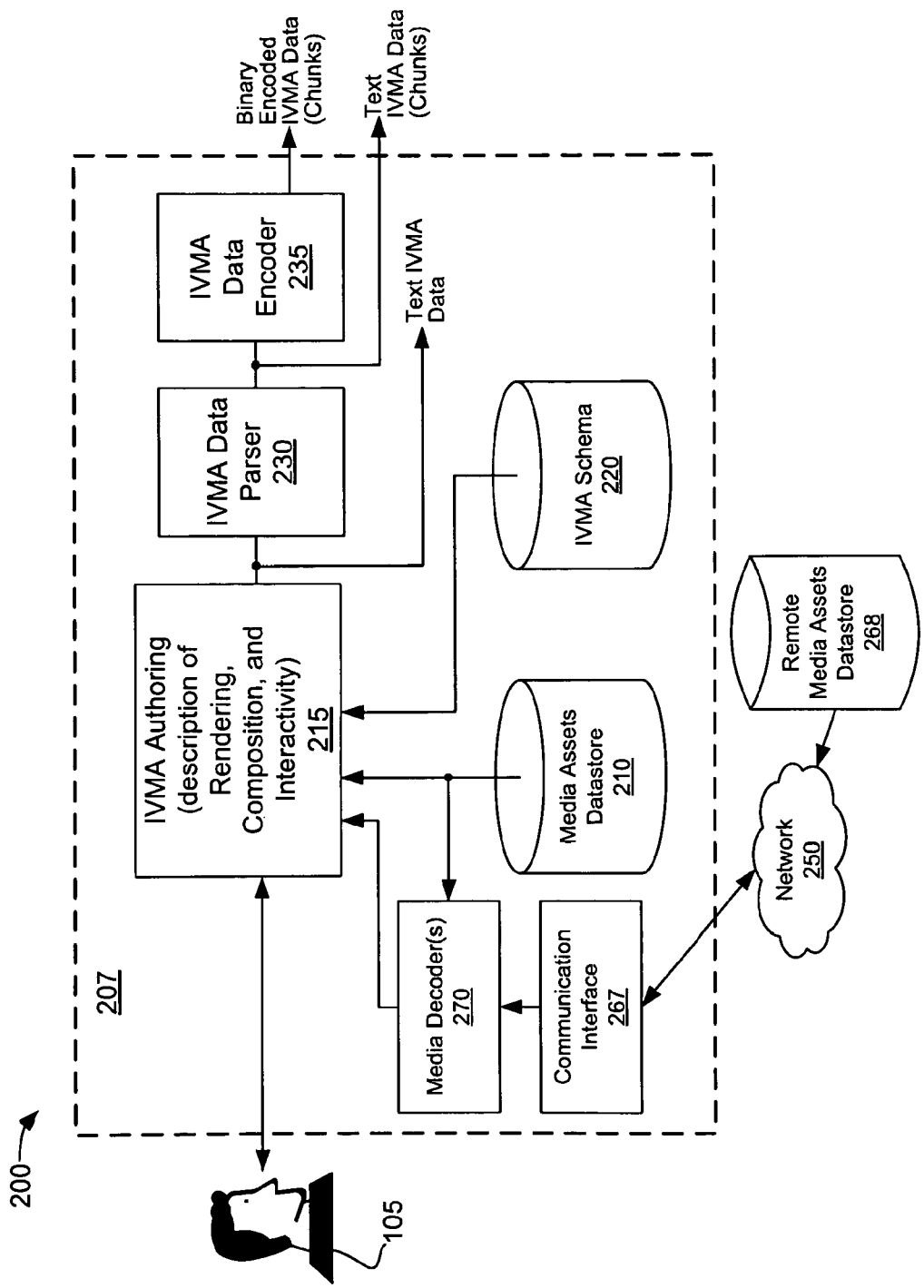
FIG. 2 is a block diagram of one embodiment of an apparatus for authoring an interactive video/multimedia application.

FIG. 2 is a block diagram of one embodiment of an apparatus 200 for authoring an IVM application. The modules shown in FIG. 2 may be implemented using one or more computing devices 207, which, as discussed above, may comprise a processor, memory, computer-readable media, communications interfaces, input/output devices, and the like. The computing device(s) 207 used to implement the apparatus 200 may be configured to operate in particular ways and/or perform particular methods by instructions stored on a computer-readable storage medium (not shown).

The author 105 may author an IVM application using an IVM application description framework or language, which may be defined in a schema 220. The schema 220 may define IVMA data elements, element attributes, and element relationships.

The RMI schema is one example of a framework or language for developing IVM applications. The RMI schema may define the rendering, composition, and interactivity behavior of an IVM application. Related, implementing technologies (disclosed herein) may provide for encoding, decoding, transporting, and presenting an IVM application authored according to the RMI schema. Although the RMI schema is discussed herein, the teachings of this disclosure are not limited in this regard and could be adapted to use any schema or framework capable of defining the behavior of an IVM application (e.g., capable of defining rendering, composition, and/or user-interactivity features of and IVM application). Moreover, although the RMI schema discussed herein is implemented as an XML schema, the elements, attributes, and/or element relationships defined in the RMI schema could be adapted to use any language definition and/or application framework known in the art.

Using the Interactive Video/Multimedia Application (IVMA) Authoring module 215, the author 105 may define an IVM application (according to the RMI schema). The IVM application may be defined as IVMA data, which may specify the content assets to be included in the IVM application (e.g., as links or paths), define how the content assets are to be rendered and/or composed, define relationships between the content assets (e.g., specify composition, layering, animation (in JavaScript® programming language or ECMAScript® programming language, etc.)), define user-interactivity features, and so on. The relationships between the content assets and/or user interactions defined in IVMA data may be predicated upon the content-aware metadata encoded within one or more of the content assets (e.g., within an encoded video asset).

The IVMA data may be authored using a text editor (not shown). Alternatively, or in addition, the IVMA Authoring module 215 may include a graphical authoring environment configured to produce IVMA data, including, but not limited to: a text editor, a graphical user interface, an integrated development environment (IDE), and the like.

The author 105 may select media assets for inclusion in the IVM application from the media asset information datastore 210. Alternatively, or in addition, media assets may be selected from other, network-accessible media asset information datastores, such as the remote media asset datastore 268, which is accessible on the network 250 via a communications interface module 267. The IVMA data may refer to the selected media assets by links or paths (e.g., XPath, URL, URI, etc.).

In some embodiments, the apparatus 200 may include media decoders 270, which may be configured to decode the selected media assets for playback to the author 105, allowing the author 105 to evaluate media assets considered for inclusion in the IVM application. One or more of the media decoder(s) 270 may be configured to extract content-aware metadata from encoded media assets.

One or more of the selected media assets may be an encoded video asset, which may include content-aware metadata. In some embodiments, the content-aware metadata may be referenced in the IVMA data to synchronize and/or control the behavior of the IVM application. The encoded video asset may have been generated (e.g., encoded and/or compressed) using the apparatus 104 described above (using the Content Adaptive Preprocessor 150 and/or Content Adaptive Encoder 155 (including the Content Adaptive Video Encoder 157 and/or the Content-Aware metadata Encoder 159) of FIG. 1B). The metadata may be available in the media asset information datastore 210. Alternatively, or in addition, the author 105 may have access to a content adaptive preprocessor (not shown) and/or Content Adaptive Video Encoder (not shown), which may be used to encode video comprising content-aware metadata during IVM application authoring. One example of such a system is described below in conjunction with FIG. 4.

The author 105 may key the rendering, composition, and/or user-interactivity features of the IVM application to one or more content-aware metadata entries embedded within an encoded video asset. For example, content-aware metadata may be used to define the temporal combination of multimedia assets. In one example, an encoded video asset may include content-aware metadata identifying an ROI within the video, which may correspond to a break in the action of a baseball game (e.g., the seventh inning stretch). The author 105 may want the IVM application to display an advertising image (or other multimedia element) during the break. See FIGS. 13A-13C. The author 105 may define this behavior by keying the display of the advertising images to the ROI content-aware metadata in the video (e.g., the IVMA data defining the IVM application may key the display of the advertising images to the content-aware metadata). The IVMA data may reference the ROI metadata using an identifier assigned to the ROI metadata in the encoded video asset, which may comprise an alpha numeric identifier, a link, a path (e.g., XPath, URL, URI), or the like. As will be discussed below, as the encoded video content is decoded for playback in the IVA application, the decoder may inform the IVA application that the identified content-aware metadata has been detected. Responsive to detection of the content-aware metadata, the IVA application may cause the video scene to be updated (e.g., cause the advertising images to be displayed).

Content-aware metadata may also be used to define the spatial relationships between multimedia assets in an IVM application. For example, content-aware metadata within an encoded video asset may specify a spatial region (ROI) within one or more video frames and/or scenes. The region of interest may correspond to an object within the video (e.g., a baseball player, racecar, or the like), a billboard, a user-defined area, a color region, or the like. The author 105 may want the IVM application to display another element in the same area or similar area as the ROI in the video scene (e.g., at an offset from the ROI). In one example, the author 105 may want the IVM application to display a graphic showing the batting average of a baseball player when the player appears in the video (the position of the baseball player may be defined by the content-aware metadata). The author 105 may want the graphic to be displayed next to the player as he moves within the field. The author 105 may define this behavior by keying the display location of the multimedia element (e.g., the batting average graphic) to the content-aware metadata in the encoded video (e.g., the IVMA data defining the IVM application may key the display location of the element(s) to the location specified by the content-aware metadata). The author 105 may cause the display area to move with the player by referencing other content-aware metadata, such as local motion vectors, or the like.

The author 105 may leverage content-aware metadata to define other aspects of the IVM application (aside from spatio-temporal combination examples discussed above.). For example, and as discussed above, content-aware metadata may be used to determine how multimedia elements are to be combined. In one example, the content-aware metadata may provide depth-mapping information (e.g., may identify foreground and background regions within a scene), which may be used to combine the media assets (e.g., using a z-buffer, alpha blending, or other depth-aware combination technique). In another example, content-aware metadata may define a model (in 2-D or 3-D) of an object displayed within one or more frames. The model may be used to incorporate other multimedia elements into the scene (e.g., translate an advertising image into the 3-D model of the object to overlay the image thereon, to carry controls for the display, etc.).

In some embodiments, user-interactivity features of the IVM application may be enabled by content-aware metadata.

For example, content-aware metadata may be used to define a user-selectable hotspot (discussed below) corresponding to a region of interest and/or objects within one or more video frames or scenes. Similarly, user-interactivity features may be predicated upon the occurrence of particular events in the video (e.g., using ROI content-aware metadata), scene changes, scene fingerprint, scene movement, object and object movement within the scene, and the like.

In one example, the author 105 may designate an ROI (or other object) defined in content-aware metadata as a user-selectable hotspot. The IVMA data may specify one or more scene changes to occur responsive to user selection of the hotspot. For example, selection of a "racecar" region of interest hotspot may cause an additional multimedia element comprising information about the racecar to be displayed with the video asset (e.g., the driver of the car, the number of laps since the car's last pit stop, and the like). As discussed above, the IVA application may use the content-aware metadata to cause the display to be placed in the vicinity of the racecar object and/or may cause the display to follow the movement of the racecar as it moves around the track (e.g., using content-aware metadata identifying the position and/or local motion vectors of the object).

In another example, the IVMA data may specify that selection of a hotspot is to cause an enhanced version (e.g., zoomed-in view) of the ROI to be displayed in the IVM application. For instance, selection of the racecar hotspot may cause a region around the racecar to be presented in a higher resolution (e.g., overlaid on the first content asset, presented in a picture-in-picture view, or the like). In other examples, a user-controlled object may change its position according to global or local motion vectors available as content-aware metadata in the encoded video, selection of a table of contents multimedia element may cause playback to skip to another chapter, and so on. In other examples, the IVM data may specify that a hotspot, when clicked on or otherwise when interacted with by the user, may activate a link (e.g., XPath, URL, URI) to other data.

Although particular types of content-aware metadata enabled renderings, compositions, and/or user-interactivity features are described herein, the disclosure is not limited in this regard. The teachings of this disclosure could be adapted to enable other types of rendering, composition, and/or user-interactivity features, including, but not limited to: combination of plural multimedia assets, overlay of advertising imagery, overlay of graphical elements (e.g., text, 2D graphical elements, 3D graphical elements, vector graphics, and the like), audio mixing, zooming, panning, object manipulation, user-interface elements, and the like.

As discussed above, the author 105 may define an IVM application as IVMA data, which may identify the media assets to include in the IVM application, specify how the assets are to be rendered and composited, and define any user-interactivity features of the IVM application. The author 105 may author the IVMA data using a separate text editor (not shown) and/or may author the IVMA data using the IVMA Authoring module 215.

The IVMA data may be embodied as XML data that complies with the schema 220 (e.g., the RMI schema). The IVMA Authoring module 215 may be configured to validate authored IVMA data against the schema 220. The validation may comprise validating the paths or links to content assets (e.g., media asset information datastore 210 or network storage location (not shown)) and/or validating references to content-aware metadata in the IVMA data (e.g., validating the content-aware metadata referenced in the IVMA data exists in the corresponding encoded video assets).

The textual representation of the IVMA data may optionally flow to an IVMA Data Parser module 230, which may be configured to parse the IVMA data into two or more chunks. The chunks may flow to an IVMA Data Encoder module 235, which may be configured to encode the IVMA data chunks into a compressed, binary format. In some embodiments, however, the IVMA Parser 230 and/or IVMA Data Encoder 235 module(s) may be bypassed, and the IVMA data may remain as text data and/or as a single set of binary encoded data (e.g., the textual representation may flow directly to the encoding module 235). Although not depicted in FIG. 2, in some embodiments, the apparatus 200 may include switches, multiplexers, or other data flow components configured to route the IVMA data to/from the IVMA Data Parser 230 and/or IVMA Data Encoder 235 modules.

Figure 3:
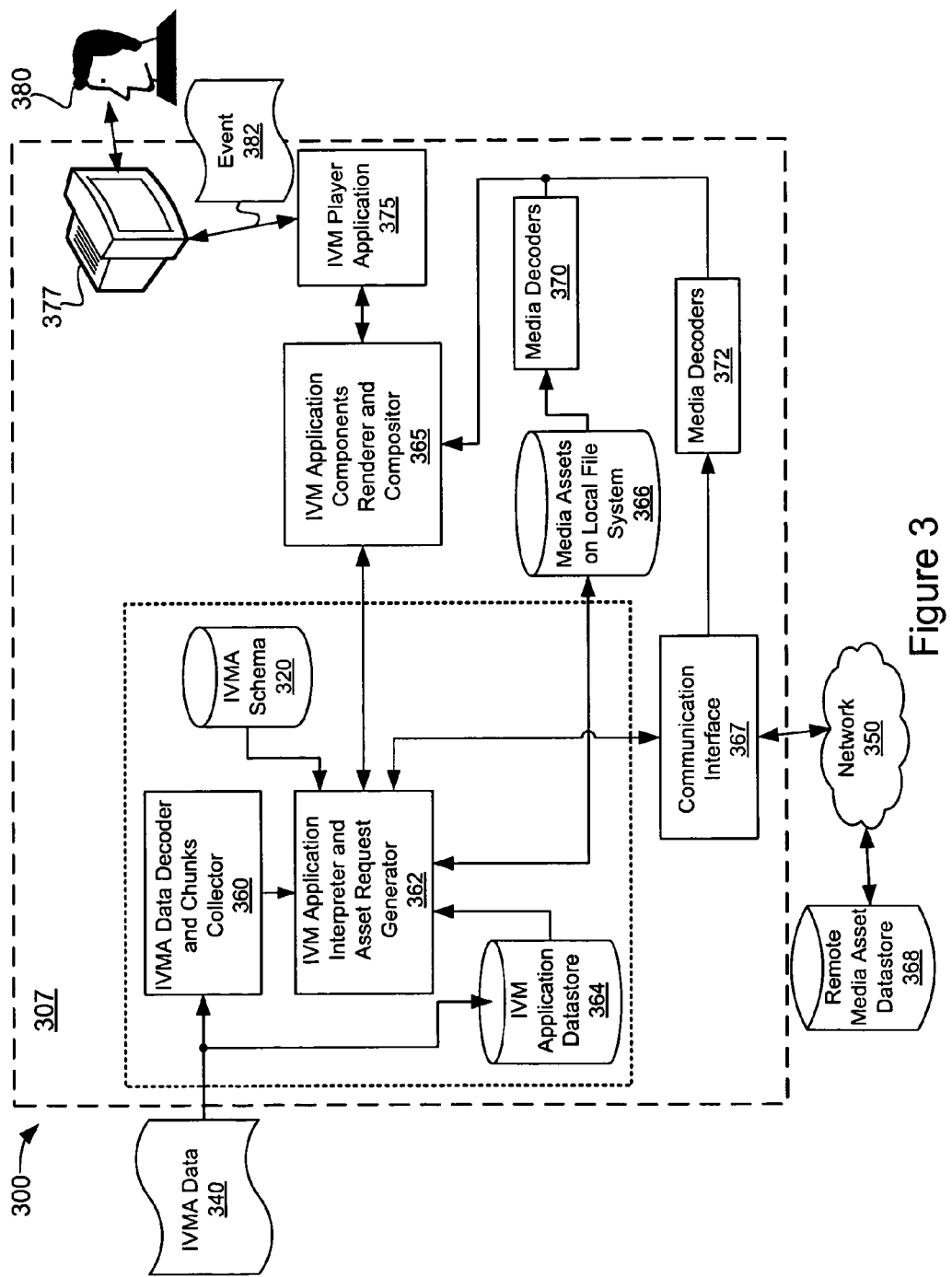
FIG. 3 is a block diagram of one embodiment of an apparatus configured to implement an interactive video/multimedia presentation.

The IVMA data produced by the apparatus 200 may flow to a playback component which may provide the enabling technologies required to implement the IVM application defined thereby (e.g., implement rendering, composition, and/or user-interactivity features defined by the IVMA data). FIG. 3 shows a block diagram of one embodiment of apparatus 300 configured to implement an IVM application defined by IVMA data. The apparatus 300 may be implemented using a computing device 307, which may comprise a processor (not shown), memory, computer-readable storage media (e.g., IVMA data storage 364, schema 320, local asset storage 366 and the like), input/output devices (e.g., HMI 377), communications interfaces (e.g., communication interface 367), and the like.

IVMA data 340 may be received by an IVMA Data Decoder and Chunks Collector module 360, which may be configured to decode and/or reconstruct chunks of the IVMA data 340 (e.g., aggregate one or more chunks of the IVMA data 340 in the proper order). The decoded and/or reconstructed IVMA data may flow to the IVMA Data Interpreter and Asset Request Generator module 362. In some embodiments, the encoded and/or reconstructed IVMA data may be stored in the IVM application datastore 364 for subsequent access.

The IVM Application Interpreter and Asset Request Generator module 362 may interpret the IVMA data. The interpretation may comprise accessing a schema 320, such as the RMI schema discussed above. If the IVMA data 340 is embodied as binary encoded data, the schema access may not be required. Alternatively, or in addition, the IVM Application Interpreter and Asset Request Generator module 362 may access previously stored IVMA data directly from the IVM application datastore 364. For example, the IVMA data 340 may be downloaded and/or transmitted to the apparatus 300 before playback occurs (e.g., as part of a Really Simple Syndication (RSS) feed, a dedicated download, or the like). The IVMA data 340 may be stored in an IVM application datastore 364, until a user elects to playback the IVM application defined thereby, at which point the IVMA data 340 may be accessed.

As discussed above, IVMA data may reference one or more multimedia assets for playback in the IVM application. The IVM application interpreter and access request generator module 362 may access content assets referenced in the IVMA data from a local file system 366. If the content assets referenced in the IVMA data are not available locally (or updated versions are available), the content assets may be accessed from the remote media asset datastore 368 via the network 350 (e.g., TCP/IP network, Internet, WAN, LAN, or the like) using a communications interface 367 (e.g., Ethernet interface, wireless interface, or the like).

During playback, content assets that are in raw digital form (PCM) may flow directly to an IVM Application Renderer and Composer module 365. Content assets that are available in an encoded, compressed format may be decoded by an appropriate media decoder module 370 and/or 372. In the FIG. 3 example, the media decoders 370 may be configured to decode media assets available on the local file system 366, and the media decoders 372 may be used to decode media assets accessed from the remote media asset datastore 368. The media assets may be decoded into PCM form for use by the IVM Application Renderer and Compositor module 365. In some embodiments, the media decoder modules 370 and/or 372 may be configured to extract content-aware metadata embedded within encoded multimedia assets.

Content-aware metadata embedded within encoded video assets referenced in the IVMA data may be extracted by the media decoders 370 and/or 372 during playback. The content-aware metadata may be provided to the IVM Application Interpreter and Asset Request Generator module 362, which, as discussed above, may use the content-aware metadata to update the IVM application (e.g., by a direct communication path therebetween (not shown) and/or through a communication path provided by the IVM Application Components Renderer and Compositor module 365). As discussed above, the content-aware metadata may be used by the IVM Application Interpreter and Asset Request Generator module 362 to determine rendering, composition, and/or user-interactivity features of the IVM application as defined by the IVMA data.

The IVM Application Interpreter and Asset Request Generator module 362 may interpret the IVMA data and extracted content-aware metadata to determine how the media assets referenced by the IVMA data should be rendered and composed in the IVM Application. The IVM Application Interpreter and Asset Request Generator module 362 may provide instructions to the IVM Application Components Renderer and Compositor module 365 on how the media assets are to be rendered, animate, and/or composite the media assets per the IVM Application.

The output of the IVM Application Components Renderer and Compositor 365 flows to the IVMA Player Application 375, which may be configured to cause the HMI 377 to present the rendered IVM application to a user 380. In some embodiments, the IVMA Player Application 375 may be embedded within another application, such as a plug-in of a web browser. The HMI 377 may include a visual display (e.g., monitor), audio outputs (e.g., amplifier, speakers, etc.), input devices (e.g., a remote control, keyboard, mouse, touchpad, touchscreen, motion sensor, camera, microphone, etc.), and the like.

The HMI 377 may receive inputs from the user 380 via various input devices. The user inputs may include, but are not limited to: a mouse interaction (e.g., movement of a mouse cursor on a display, clicking a mouse button, or the like), a touch pad interaction, a touch screen interaction, a motion sensor interaction (e.g., tilting the HMI 377 or a component thereof), a keyboard input, an audio input (e.g., via a microphone), a visual input (e.g., via a camera), or the like. The user interaction may be represented as a user-interaction event 382, which may be fed back through the IVMA Player Application 375 and/or the IVM Application Components Renderer and Compositor module 365 to the IVM Application Interpreter and Asset Request generator 362, which may interpret the user-interaction event 382 according to user-interactivity features defined in the IVM application. The user-interactions may cause a change in behavior of certain elements of the IVM application (e.g., cause certain elements to be added and/or removed, change the positioning of elements, and the like). Responsive to the user interaction(s), the IVM Application Interpreter and Asset Request Generator 362 may update the IVM application (e.g., update the scene displayed to the user 380), which may comprise accessing new media assets (e.g., from the local 366 and/or remote 368 content asset datastores), updating the rendering a composition instructions provided to the IVM Application Components Renderer and Compositor module 365, and the like.

Figure 4:
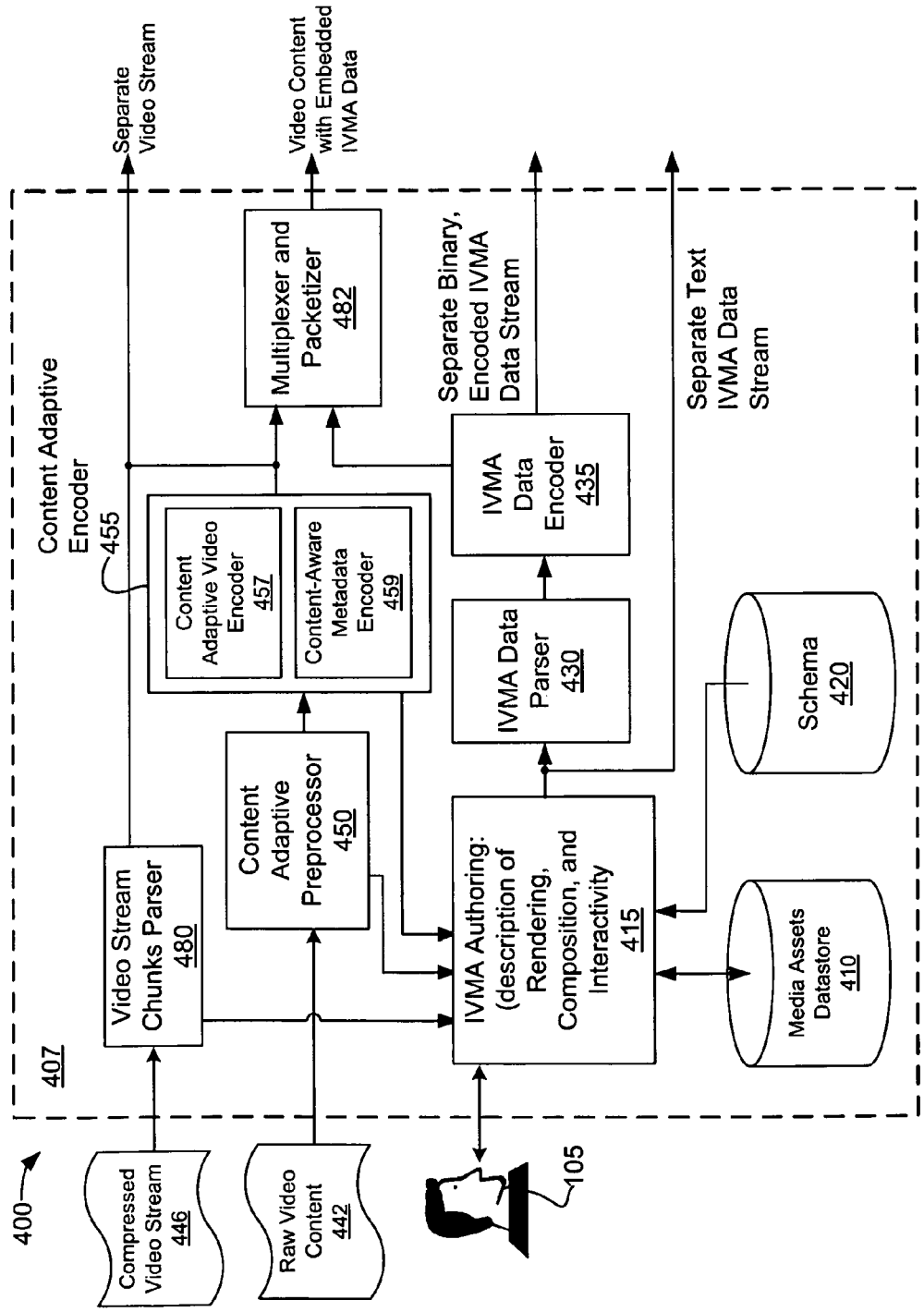
FIG. 4 is a block diagram of another embodiment of an apparatus for authoring an interactive video/multimedia application.

FIG. 4 shows another embodiment of an apparatus for authoring IVM application. The apparatus 400 may be implemented on a computing device 407, which may comprise a processor, memory, computer-readable media, input/output devices, and the like. The apparatus 400 includes a media asset information datastore 410, IVM Authoring module 415, schema 420, IVMA Data Parser module 430, and IVMA Data Encoder module 435, which may operate similarly to the modules 210, 215, 220, 230, and 235 described above in conjunction with FIG. 2. The apparatus 400 also includes a Content Adaptive Preprocessor 450 and a Content Adaptive Encoder 455 (comprising a Content Adaptive Video Encoder 457 and a Content-Aware Metadata Encoder 459), which may operate similarly to the modules 150, 155, 157, and 159 described above in conjunction with FIG. 1B. Although not shown in FIG. 4, the apparatus 400 may further include a communication interface communicatively coupled to a network through which media assets stored in one or more remote media asset datastore(s) may be accessed. In addition, the apparatus 400 may include one or more media decoders (not shown) configured to provide for playback of encoded media assets, which may allow the author 105 to evaluate the media assets for inclusion in the authored IVM application.

In the FIG. 4 example, raw video frames may be received by a content adaptive preprocessor 450 and the Content Adaptive Video Encoder 455. The preprocessor 450 may receive content coding conditions (not shown) and metadata coding conditions (not shown) from the author 105 via the authoring module 415. The Content Adaptive Preprocessor and Content Adaptive Encoding modules 450 and 455 may be configured to encode the raw video content as described above. During the encoding, content-aware metadata may be identified and embedded within the encoded video content as described above in conjunction with FIG. 1B (e.g., within a bitstream comprising the encoded and/or compressed video content). The content-aware metadata identified and embedded within the encoded video asset may be made available to the IVMA Authoring module 415.

The apparatus 400 may also receive a compressed and/or encoded video stream 446. The encoded video content 446 may be received by the Video Stream Chunks Parser module 480, which may parse and/or reconstruct the video content. Content-aware metadata within the encoded video stream 446 (if any) may be provided to the IVMA Authoring module 415 (e.g., during a reconstruction, decoding, and/or decompression process implemented by the Video Stream Chunks Parser 480). In some embodiments, the reconstructed video content may flow to the preprocessor 450 and/or Content Adaptive Encoder 455 for re-encoding into another video codec (e.g., a video codec having a different bitrate, resolution, or the like) and/or for the identification and addition of content-aware metadata.

The encoded video content produced by the video stream parser 480 and/or Content Adaptive Encoder 455 may flow to the Multiplexer and Packetizer module 482, which may combine encoded video content with IVMA data authored by the author 105 (in textual or binary, compressed format) into a single stream and/or as a set of distributed IVMA data instances (as defined in the schema 420). The IVMA data authored by the author 105 (using the IVMA Authoring module 415) may be processed by the IVMA Data Parser module 430 and/or IVMA Data Encoder modules 435. As discussed above, the IVMA Data Parser module 430 may be configured to segment the IVMA data into chunks. Each chunk of IVMA data may comprise one or more IVMA data elements or instances (e.g., in accordance with the schema 420 described below). The chunks may be binary encoded and/or compressed by the IVMA Data Encoder module 435. Alternatively, the IVMA data may bypass the IVMA Data Parser module 430 and/or IVMA Data Encoder module 435, and flow directly to the Multiplexer and Packetizer module 482 and/or made available from the apparatus 400 as text.

The Multiplexer and Packetizer module 482 may be configured to combine the chunked IVMA data (in text or compressed, binary format) with the encoded video content (produced by the Video Stream Chunks Parser 480 and/or the Content Adaptive Preprocessor 460 and Content Adaptive Video Encoder 455). The IVMA data chunks may be multiplexed with the encoded video content in various different ways, one example is described below in conjunction with FIGS. 7 and 8. The Multiplexer and Packetizer module 482 may be further configured to packetize the multiplexed stream for transmission on a network. The packet and/or transmission frame size may be selected according to the performance and/or capabilities of the network infrastructure used to transmit the data. In addition, the apparatus 400 may make separate streams of encoded video and IVMA data available in non-multiplexed form. In some embodiments, the non-multiplexed video and IVMA data may be separately packetized for network transmission (e.g., by the Multiplexer and Packetizer module 482 or another module (not shown)).

FIG. 5 depicts another embodiment of an apparatus 500 configured to implement an IVM application defined in IVMA data. The apparatus 500 may be implemented on a computing device 507, which, as discussed above, may comprise a processor, memory, computer-readable media, input/output devices, and the like.

The apparatus 500 may include a schema 520, IVMA Data Decoder and Chunks Collector module 560, IVM Application Interpreter and Asset Request Generator module 562, IVM Application datastore 564, IVM Application Components Renderer and Compositor module 565, local file system 566, communications interface 567, media decoders 570 and/or 572, IVMA Player Application 575, and HMI 577, each of which may operate similarly to the components 360, 362, 364, 365, 366, 367, 370, 375 and 377 described above in conjunction with FIG. 3. The apparatus 500 may further include a Content Adaptive Decoder module 593 (including Content Adaptive Video Decoder 595 and a Content-Aware Metadata Decoder 597 modules), which may operate similarly to the modules 193, 195, and/or 197 described above in conjunction with FIG. 1C.

The apparatus 500 may be configured to receive IVMA data as a separate stream (IVMA data stream 540) and/or multiplexed with video content (video with IVMA data 542). Multiplexed video and IVMA data 542 may be received by a DePacketizer and Demultiplexer module 590, which may be configured to depacketize and/or demultiplex the IVMA data embedded within the video asset 542. The IVMA data (if any) extracted from the video asset 542 may flow to the IVMA Data Decoder and Chunks Collector module 560, which may reconstruct the IVMA data for use by the IVM Application Interpreter and Asset Request Generator module 562. Alternatively, or in addition, the apparatus 500 may receive a separate IVMA data stream 540, which may flow directly IVMA Data Decoder and Chunks Collector module 560.

The encoded video (with the IVMA data having been extracted therefrom) may flow to the Content Adaptive Decoder module 593 for decompression and/or decoding (by the Content Adaptive Video Decoder module 595). During decoding and/or decompression, the Content-Aware Metadata Decoder 597 may extract content-aware metadata from the encoded video content. The extracted content-aware metadata may flow to the IVM Application Interpreter and Asset Request Generator 562.

The decoded video content (output by the Content Adaptive Video Decoder 595) may be prepared for rendering and/or composition by the Content Adaptive Postprocessor 598, which may be configured to select appropriate playback parameters for the decoded video content (e.g., resolution, bitrate, etc.). The playback parameters may be determined according to the HMI 577 on which the IVM application is to be displayed, according to the processing resources available, and the like.

As discussed above, during the decoding, the Content-Aware Metadata Decoder 597 may identify and extract content-aware metadata embedded within the encoded video content (e.g., embedded within the bitstream of the encoded video content). Alternatively, or in addition, content-aware metadata, such as local motion vectors, shape identification, and the like, may be determined on-the-fly as the video asset is decoded by the Content-Aware Video Decoder 595.

The content-aware metadata extracted and/or determined by the Content Adaptive Decoder module 593 may flow to the IVM Application Interpreter and Asset Request Generator module 562, which may use the content-aware metadata to provide content asset rendering, composition, and user-interactivity features of IVM application (as defined in the IVMA data).

The content-aware metadata extracted by the Content Adaptive Decoder 593 and/or the media decoders 570 and 572, may be continually updated as video content is decoded for playback in the IVM application. Accordingly, the IVM Application Interpreter and Asset Request Generator module 562 may be capable of continually updating the scene rendering and composition instructions provided to the IVM Application Components Renderer and Compositor module 565 responsive to the content-aware metadata.

Figure 6:
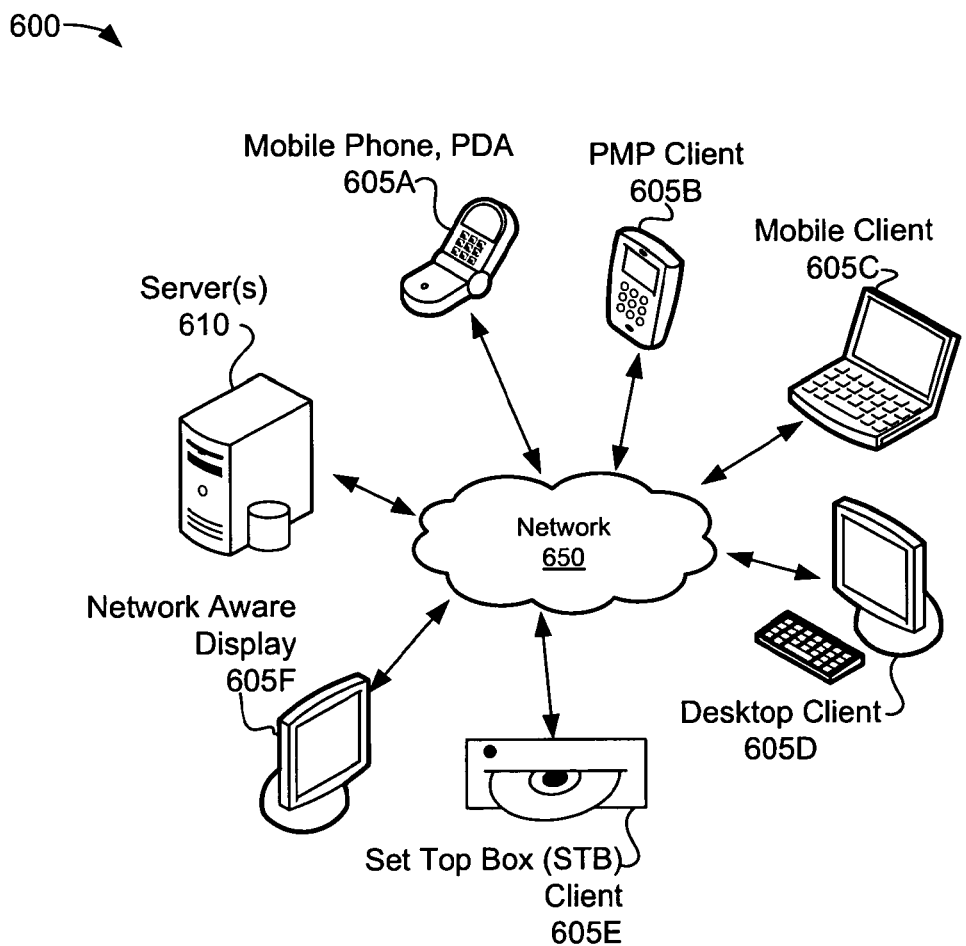
FIG. 6 is a block diagram of one embodiment of a system for distributing an interactive video/multimedia application in a distributed network.

FIG. 6 is a block diagram depicting distribution of an IVM application in a distributed network environment 600. An IVM application may be implemented on a number of different client devices 605A-605F, including, but not limited to: a mobile phone (e.g., cell phone, smart phone, Personal Digital Assistant (PDA) etc.) 605A; a Portable Media Player device (PMP) 605B; a mobile computing-device (e.g., laptop, netbook, or the like) 605C; a personal computer (e.g., a desktop) 605D; a Set Top Box (STB) 605E; an network-aware display device (e.g., Internet connected television) 605; or the like. The client devices 605A-605F may be communicatively coupled to one or more servers 610 via a network 650. The network 650 may include, but is not limited to: a dedicated network, a local area network (LAN), a wide area network (WAN), the Internet, a fiber-optic network, a wireless network, a Wi-Fi network, a mobile cellular network, a wireline home network, a public switched telephone (PSTN) network, a combination of networks, or the like.

The one or more servers 610 may provide IVMA data defining an IVM application to the client devices 605A-605F, each of which may comprise a compatible IVM application playback component. The IVM playback component may comprise software and/or hardware components. Alternatively, or in addition, the client devices 605A-605F may include media player components capable of providing for synchronized media decoding and playback. The media player components may be further configured to extract content-aware metadata embedded within encoded video assets.

The servers 610 may provide media assets referenced by the IVM application (e.g., as separate streams and/or combined into a single, multiplexed stream with the IVMA data). The servers 610 may serve IVMA data on request to multiple clients 605A-605F. The IVM application may reference locally available media assets and/or media assets obtained from the servers 610 (or from other sources) by downloading or streaming.

In some embodiments, the same set of IVMA data may be either served unaltered to different client devices 605A-605F and/or may be altered to suit the processing resources, display capabilities, and/or network conditions of a particular client device 605A-605F. Alternatively, or in addition, an IVM application (as defined by IVMA data) may be configured to provide renderings and/or compositions of media assets according to the device on which the IVM application is to be implemented. For example, the IVM application may specify that high-resolution content be displayed on desktop computer 605D and/or STB 605E clients, whereas lower resolution content should be displayed on a mobile phone client 605A.

Figure 7:
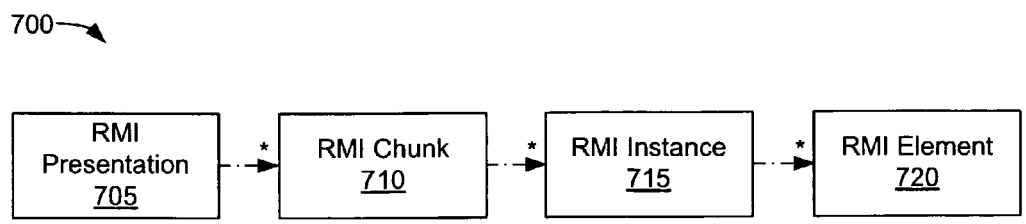
FIG. 7 is a diagram of one example of an interactive video/multimedia description data structure.

As discussed above, IVMA data may be segmented into two or more chunks, which may be optionally binary encoded and multiplexed into video content. FIG. 7 depicts one example of a Unified Modeling Language- (UML-) type representation of segmented IVMA data. In the FIG. 7 example, the IVMA data is embodied as RMI presentation data compliant with the RMI schema disclosed herein.

As shown in FIG. 7, an RMI presentation 700 may be segmented into a plurality of chunks of RMI data 710. Each RMI chunk 710 may comprise one or more RMI instances 715, each of which may comprise one or more RMI elements (as defined by the RMI schema). In accords with the RMI schema, a properly formed RMI presentation may include one or more required RMI elements 720 and/or more optional RMI elements 720. In the RMI schema, various RMI elements 720 have been given names and attributes to reflect their respective properties and behavior.

As defined by the RMI schema, an RMI instance 715 may be embedded within a media asset (for later reconstruction). For example, an RMI instance 715 may be embedded within uncompressed and/or compressed digital video streams (e.g., by multiplexing the RMI instance data within video content using a Multiplexer and Packetizer module, such as module 482 of FIG. 4). Alternatively, or in addition, an RMI instance 715 may be embedded within other content types, such as digital audio streams, texture data (e.g., texture mapping, texture atlas, or other data), streaming modeling data, or the like. In embodiments in which an RMI instance 715 is placed within video content at a video frame level, the RMI instance 715 may be uniquely identified by a start code or an offset within the video frame. Similar identification may be provided in embodiments in which an RMI instance 715 is embedded within other content types.

The following is an example of placement of an RMI instance (e.g., an RMI instance element) within a video stream. The following examples are implemented using a prior version of the RMI schema (the schema version disclosed in U.S. Provisional Application No. 61/192,136, filed Sep. 16, 2008, for "Systems and Methods for Advanced Interactive Video/Multimedia") incorporated by reference above. However, the following examples could be adapted to conform to the updated RMI schema disclosed herein.

```
<?xml version="1.0" encoding="UTF-8"?>
<RMI xmlns:xsi="http://www.w3.org/2001/XMLSchema-instance"
xsi:noNamespaceSchemaLocation="file:///F:/DEMO_F/RMI/2008-09-10-
RMIPlayerDX/rmi104.xsd" FrameRate="24">
    <Canvas Width="1280" Height="720">
    </Canvas>
<VideoSource Xpos="0" Ypos="40" VideoID="40" DepthOrder="1"
Width="704" Height="352" FrameRate="23.976" StartPlaying="false"
RenderedWidth="1280" RenderedHeight="640" SyncStreamIDs="140" >
        <LocalObjectLocation>E:\VIDSRC\ch
36_704x352.yuv</LocalObjectLocation>
        <MediaControlAction Control="PLAYPAUSE"
TargetID="40"/>
    </VideoSource>
    <AudioSource AudioID="105" StartPlaying="false">
        <LocalObjectLocation>E:\VIDSRC\ch
01.d2v.wav</LocalObjectLocation>
    </AudioSource>
<TextOverlay ID="205" DepthOrder="3" Duration="5000000">
        <BoundingBox TopLeftX="28" TopLeftY="26"
BottomRightX="40" BottomRightY="40" />
        <Color R="200" G="200" B="200"/>
        <Font FamilyName="Chicago" Size="11"
Weight="bold"/>
        <Text>CHAPTER 1</Text>
    </TextOverlay>
<TextOverlay ID="255" DepthOrder="3" Duration="5000000"
Visible="0">
        <BoundingBox TopLeftX="1038" TopLeftY="656"
BottomRightX="1238" BottomRightY="674" />
        <Color R="200" G="200" B="200"/>
        <Font FamilyName="Chicago" Size="13"
Weight="bold"/>
        <Text>Extras: Making of Movie</Text>
    </TextOverlay>
<VideoChain ID="159" Visible="1">
        <VideoSource Xpos="256" Ypos="0" VideoID="59"
DepthOrder="2" Width="64" Height="32" AlphaBlend="200"
FrameRate="23.976" >
            <LocalObjectLocation>E:\VIDSRC\ch
05_64x32.yuv</LocalObjectLocation>
            <TargetAction TargetID="9"
SyncWithSource="true"/>
        </VideoSource>
    </VideoChain>
<RMIPolygon FramePolygon="0" FillPolygon="1" ID="300"
DepthOrder="3" LineR="200" LineB="20" LineG="20" FillR="255"
FillG="255" FillB="255" AlphaBlend="50" Visible="0">
        <Point X="205" Y="120"></Point>
        <Point X="305" Y="120"></Point>
        <Point X="355" Y="220"></Point>
        <Point X="305" Y="320"></Point>
        <Point X="205" Y="320"></Point>
        <Point X="155" Y="220"></Point>
        <Point X="205" Y="120"></Point>
        <TargetAction TargetID="80"/>
        <Animation Duration="2000" FinalXPos="600"
FinalYPos="200" />
    </RMIPolygon>
    </Scene>
    </RMIInstance>
</RMI>
```

As discussed above, some RMI elements 720, such as Table of Contents (ToC) element may apply to large portions of the RMI presentation 705 (e.g., may be "global" RMI elements). As illustrated above, an RMI presentation 705 (in binary and/or textual form) may be transmitted as a separate stream or file and/or may be embedded within another content type (e.g., embedded within a video stream). As a user accesses the RMI presentation 705, the user (or the RMI presentation 705 itself) may cause various different portions of the video stream to be played back (e.g., may navigate to different portions of chapters within the video stream, switch between streams or channels, or the like). If the RMI presentation 705 (or global RMI elements 720 thereof) is embedded only within a first portion of the video stream, and another portion of the stream is requested, it may be difficult to get access to the RMI presentation 705 and/or the global elements 720 thereof. Accordingly, in some embodiments, the RMI presentation 705 in whole or in part (e.g., only "global" RMI elements 720, such as ToC elements), may be periodically repeated (re-embedded) Alternatively, or in addition, the RMI presentation 705 may be distributed throughout the media stream at particular, known intervals, such as the beginning or end of a frame (uncompressed or compressed). When one or more RMI elements 720 are so embedded, they may be referred to as RMI instances 715. The embedded RMI instances 715 may be those instances that are relevant to the proximate frames. In addition, RMI elements 720 considered to be more "global" in nature (e.g., having the potential to affect the presentation as a whole, such as ToC elements, or the like) may be included, which may cause the global RMI elements 720 to be repeated.

Figure 8:
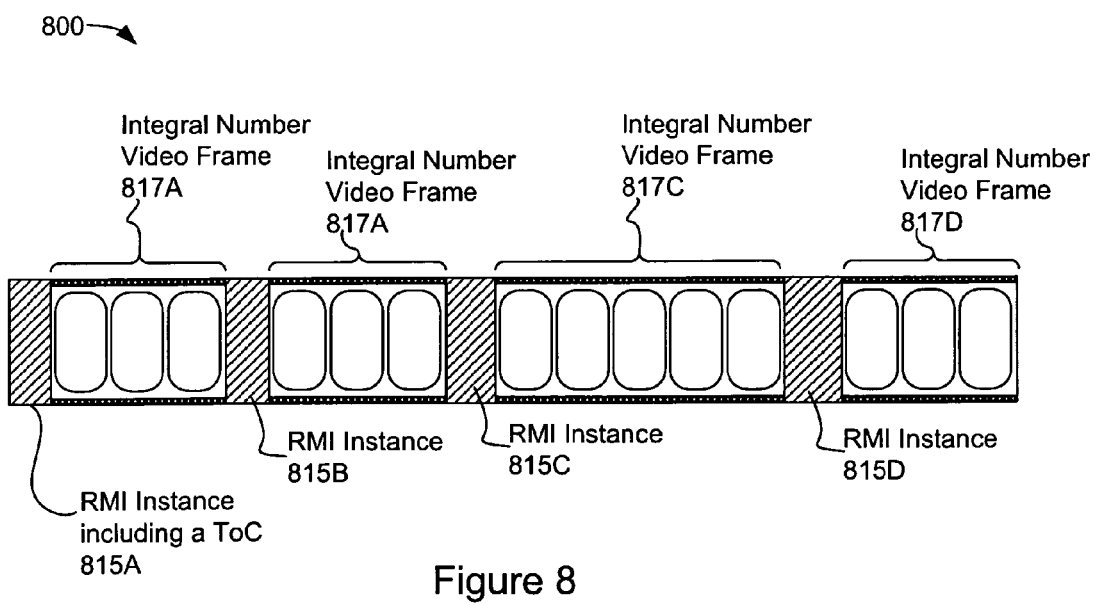
FIG. 8 is a diagram of interactive video/multimedia description data embedded within video content.

FIG. 8 depicts one example of video content 800 comprising embedded RMI instances 815A-815D (each of which may comprise one or more RMI elements and associated attributes). The location of the RMI instances 815A-815D within the video content 800 may be determined by respective integral number video frames 817A-817D. A first RMI instance 815A may provide "global" RMI presentation elements including a table of contents (ToC) and the like. As shown in FIG. 8, multiple RMI instances 815A-815D may be distributed within the video content 800. In some embodiments, subsequent RMI instances (e.g., RMI instances 815B-815D) may include global RMI elements, such as the ToC element within the RMI instance 815A.

The following is a one example of an RMI presentation comprising embedded RMI instances:

```
<?xml version="1.0" encoding="UTF-8"?>
<RMI xmlns:xsi="http://www.w3.org/2001/XMLSchema-instance"
xsi:noNamespaceSchemaLocation="file:///F:/DEMO_F/RMI/2008-09-10-
RMIPlayerDX/rmi104.xsd" AdProfile="AdProfileNascarDemo4.aprf"
FrameRate="60">
  <Canvas Width="1280" Height="720">
  </Canvas>
  <!-- Usage of ImageOverlay element RenderedWidth="176"
RenderedHeight="144" -->
    <RMIInstance FrameOffset="1">
      <!-- Bud Ad1 -->
      <Scene ID="0">
        <!-- Main video -->
        <VideoSource Xpos="31" Ypos="28"
VideoID="10" DepthOrder="1" Width="640" Height="360"
RenderedWidth="1214" RenderedHeight="658" SyncStreamIDs="20"
FrameRate="59.97" >
          <LocalObjectLocation>F:\DEMO_F\NGV\Nascar\
rac_01_09_40a_10_p2_640x360.yuv</LocalObjectLocation>
        </VideoSource>
        <!-- Ad video Initially disabled-->
        <VideoSource Xpos="200" Ypos="28" VideoID="11"
DepthOrder="2" Width="480" Height="360" RenderedWidth="878"
RenderedHeight="658" AlphaBlend="175" StartPlaying="0"
SyncStreamIDs="21" FrameRate="23.976" >
          <LocalObjectLocation>null.yuv</LocalObjectLocation>
              <TargetAction TargetID="11"/>
        </VideoSource>
        <!-- Main Audio -->
        <AudioSource AudioID="20" StartPlaying="true">
        <LocalObjectLocation>E:\VIDSRC\HDtoSD\NASCAR\
rac\rac_01_09_40.wav</LocalObjectLocation>
        </AudioSource>
        <!-- Ad-Audio -->
        <AudioSource AudioID="21" StartPlaying="false">
        <LocalObjectLocation>null</LocalObjectLocation>
        </AudioSource>
        <!-- First Ad Image Initially disabled AlphaBlend
-->
        <ImageOverlay ContentType="3" Duration="0"
Visible="0" DepthOrder="3" ID="30" AlphaBlend="255">
          <BoundingBox TopLeftX="31" TopLeftY="28"
BottomRightX="95" BottomRightY="92" />
          <!-- <Animation Duration="1000"
FinalXPos="64" FinalYPos="40" LoopAnimation="false" /> -->
          <TargetAction TargetID="11"/>
        <LocalObjectLocation>null.png</LocalObjectLocation>
        </ImageOverlay>
        <MetaData Name="ADWD" ImageObjects="30"
VideoObjects="11" AudioObjects="21" MainVideoId="10"
MainAudioId="20" VidDuration="15000" Duration="500000"
StartOffset="600"><Text>beer</Text></MetaData>
      </Scene>
      <!-- McDonald Ad2 -->
      <Scene ID="100">
        <!-- Main video -->
        <VideoSource Xpos="31" Ypos="28"
VideoID="110" DepthOrder="1" Width="640" Height="360"
RenderedWidth="1214" RenderedHeight="658" SyncStreamIDs="120"
FrameRate="59.97" >
          <LocalObjectLocation>F:\DEMO_F\NGV\Nascar\
rac_02_11_27a_10_p2_640x360.yuv</LocalObjectLocation>
        </VideoSource>
        <!-- Ad video Initially disabled-->
        <VideoSource Xpos="31" Ypos="28" VideoID="111"
DepthOrder="2" Width="480" Height="360" RenderedWidth="878"
RenderedHeight="658" AlphaBlend="175" StartPlaying="0"
SyncStreamIDs="121" FrameRate="23.976" >
          <LocalObjectLocation>null.yuv</LocalObjectLocation>
              <Animation Duration="30000" FinalXPos="380"
FinalYPos="28" />
              <TargetAction TargetID="111"/>
        </VideoSource>
        <!-- Main Audio -->
        <AudioSource AudioID="120" StartPlaying="true">
        <LocalObjectLocation>E:\VIDSRC\HDtoSD\NASCAR\rac\
rac_02_11_27.wav</LocalObjectLocation>
        </AudioSource>
        <!-- Ad-Audio -->
        <AudioSource AudioID="121" StartPlaying="false">
        <LocalObjectLocation>null</LocalObjectLocation>
        </AudioSource>
        <!-- First Ad Image Initially disabled AlphaBlend
-->
        <ImageOverlay ContentType="3"
Duration="2000000" Visible="0" DepthOrder="3" ID="130"
AlphaBlend="255">
          <BoundingBox TopLeftX="31" TopLeftY="28"
BottomRightX="95" BottomRightY="92" />
          <TargetAction TargetID="111"/>
        <LocalObjectLocation>null.png</LocalObjectLocation>
        </ImageOverlay>
        <RMIRectangle FrameRectangle="0" ID="140"
FillRectangle="0" DepthOrder="3" FillR="200" FillG="20"
FillB="20">
          <BoundingBox TopLeftX="828" TopLeftY="74"
BottomRightX="1027" BottomRightY="121"></BoundingBox>
          <TargetAction TargetID="111"/>
        </RMIRectangle>
        <MetaData Name="ADWD" ImageObjects="130"
VideoObjects="111" AudioObjects="121" MainVideoId="110"
MainAudioId="120" VidDuration="25000" Duration="500000"
StartOffset="600"><Text>burger</Text></MetaData>
      </Scene>
      <ImageOverlay ContentType="3" Duration="0" ID="92"
DepthOrder="3" Visible="1" >
          <BoundingBox TopLeftX="616" TopLeftY="688"
BottomRightX="640" BottomRightY="712" />
          <!-- <TargetAction TargetID="900"/> -->
          <TargetAction HideTargets="0 100 200 300 400 500"
ShowTargets="900" />
          <LocalObjectLocation>E:\DEMO\RMI\image\32px-
Crystal_Clear_app_noatun.png</LocalObjectLocation>
      </ImageOverlay>
      <ImageOverlay ContentType="3" Duration="0" ID="93"
DepthOrder="0" Visible="1">
```

```
        <BoundingBox TopLeftX="0" TopLeftY="0"
BottomRightX="1280" BottomRightY="832"/>
        <LocalObjectLocation>E:\DEMO\RMI\image\TV-MU-
60PZ95V__LG.jpg</LocalObjectLocation>
      </ImageOverlay>
      <TextOverlay ID="94" DepthOrder="3" Duration="0"
Visible="true">
        <BoundingBox TopLeftX="30" TopLeftY="30"
BottomRightX="450" BottomRightY="130" />
        <Color R="250" G="250" B="250"/>
        <Font FamilyName="Lucida Console" Size="28"/>
        <!-- Horizontal animation -->
        <Animation Duration="40000" FinalXPos="830"
FinalYPos="655" LoopAnimation="true" />
        <Text>NGV Interactive Ads</Text>
      </TextOverlay>
  </RMIInstance>
</RMI>
```

The example above illustrates exemplary RMI elements that may be required to define an RMI presentation, including headers, a <Canvas> element, a <VideoSource> element, an <AudioSource> element, and a <Text> element. The example also illustrates an example of a chain of video content <VideoChain>, as well as video content (e.g., a Video element) with alpha-blending attributes and definition of generic graphics polygon <RMIPolygon>. The portion of the presentation shown here is part of full presentation that corresponds to the screenshot depicted in FIG. 13A.

The following is a second example of RMI presentation comprising RMI instances:

```
<?xml version="1.0" encoding="UTF-8"?>
<RMIxmlns:xsi="http://www.w3.org/2001/XMLSchema-
instance"xsi:noNamespaceSchemaLocation="file:///F:/DEMO_F/RMI/20
08-09-10-RMIPlayerDX/rmi104.xsd" FrameRate="30">
  <Canvas Width="1280" Height="720">
    <Color R="128" G="128" B="128"/>
  </Canvas>
  <!-- Usage of Scene element -->
  <RMIInstance FrameOffset="10">
    <Scene ID="450">
      <VideoSource Xpos="1200" Ypos="0" VideoID="300"
DepthOrder="3" Width="352" Height="288" RenderedWidth="704"
RenderedHeight="576" FrameRate="29.97" LoopVideo="1">
        <LocalObjectLocation>E:\VIDSRC\CIF\Dancer\
          dancer_cif_1.yuv</LocalObjectLocation>
        <TransparentColor MinR="55" MinG="55" MinB="55"
MaxR="85" MaxG="85" MaxB="85"/>
        <Animation Duration="2000" FinalXPos="280"
FinalYPos="100" />
      </VideoSource>
      <VideoSource Xpos="800" Ypos="0" VideoID="301"
DepthOrder="3" Width="352" Height="288"
AlphaMask="E:\VIDSRC\CIF\Dancer\dancer_cif_1.seg"
AlphaBlend="150" FrameRate="29.97" StartOffset="100"
LoopVideo="1">
        <LocalObjectLocation>E:\VIDSRC\CIF\Dancer\
          dancer_cif.yuv</LocalObjectLocation>
        <AlphaAnimation Duration="5000"
InitialAlpha="225" FinalAlpha="0" LoopAnimation="1"/>
      </VideoSource>
      <!-- Image is the next slide button -->
      <ImageOverlay ContentType="3" Duration="9000"
Visible="1" ID="105" DepthOrder="2" AlphaBlend="255">
        <BoundingBox TopLeftX="1248" TopLeftY="694"
BottomRightX="1268" BottomRightY="716"/>
        <TransparentColor MinR="255" MinG="255"
MinB="255" />
        <TargetAction MouseOver="1" TargetID="451"/>
        <LocalObjectLocation>E:\DEMO\RMI\image\32px-
Go-down-rot__svg.png</LocalObjectLocation>
      </ImageOverlay>
    </Scene>
```

```
      <TextOverlay ID="94" DepthOrder="3" Duration="0"
Visible="1">
        <BoundingBox TopLeftX="30" TopLeftY="350"
BottomRightX="680" BottomRightY="430" />
        <Color R="20" G="20" B="250"/>
        <Font FamilyName="Chicago" Size="36"
Style="italic" />
        <!-- Horizontal animation -->
        <Animation Duration="50000" FinalXPos="635"
FinalYPos="350" LoopAnimation="true" />
        <Text>NGV Interactive Objects/ROI</Text>
      </TextOverlay>
      <!-- Rectangle -->
      <RMIRectangle FrameRectangle="1" ID="95"
FillRectangle="1" DepthOrder="2" Duration="0" FillR="60"
FillG="60" FillB="60">
        <BoundingBox TopLeftX="31" TopLeftY="28"
BottomRightX="1245" BottomRightY="688"></BoundingBox>
      </RMIRectangle>
  </RMIInstance>
</RMI>
```

This example illustrates the use of a <scene> RMI element that specifies a grouping of audio, video, image and text content assets. An image content asset may be specified by an <ImageOverlay> RMI element. The addition of a <TargetAction> attribute to an RMI element specifying image, video, text or graphics content allows behavior to be added to the element, such as a change to the state of the element (e.g., turn it on/off, which may cause the corresponding element to the added and/or removed from a display). The example also illustrates the combination of a first content asset with an additional multimedia element item using <VideoSource> and <LocalObjectLocation> elements. The elements and attributes associated with the secondary item (dancer animation "dancer_cif_1.yuv"), may define how the element is combined (e.g., using an <AlphaAnimation> element) with other video content, and the like. The example further illustrates the use of user-interaction components. A "next slide button" is defined using an <ImageOverlay> RMI element referencing a button image in PNG image format. The example further specifies actions to be taken when a user interacts with the user-interaction element (e.g., using the <TargetAction> RMI element).

Figure 9A:
FIGS. 9A and 9B depict screen shots of exemplary interactive video/multimedia presentations comprising a video-wall-like playback of four and two video assets of the same scene.
Figure 9B:

FIGS. 9A and 9B depict screen shots of an RMI presentation in which interactive scenes of windowed video-wall-like playback of four (in FIG. 9A) and two (in FIG. 9B) videos of the same scene are displayed. This presentation of FIG. 9 was constructed using RMI elements disclosed herein.

Figure 10A:
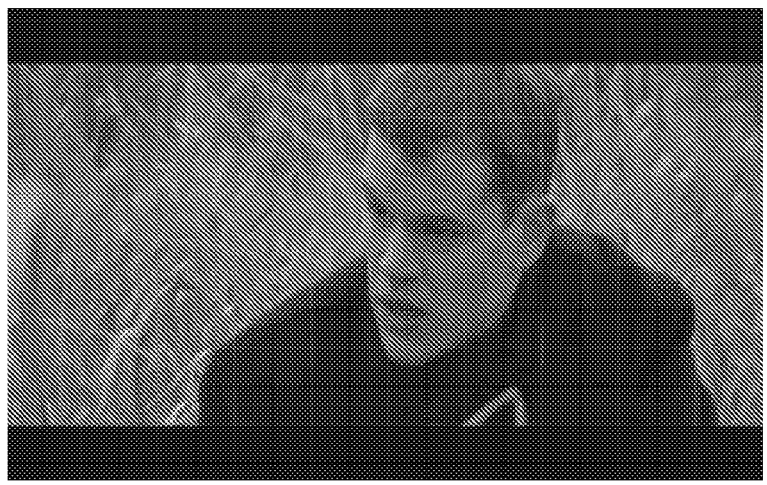
FIGS. 10A, 10B, and 10C depict screen shots of an exemplary interactive video/multimedia presentation concurrently displaying three out of ten video scalability layers.
Figure 10B:
Figure 10C:

FIGS. 10A, 10B, and 10C depict screen shots of an RMI presentation comprising RMI interactive scenes showing three out of ten video scalability layers available of the same scene. A first layer is depicted in FIG. 10A, a second in FIG. 10B, and a third in FIG. 10C. The RMI presentation depicted in FIGS. 10A-10C was constructed using RMI elements taught herein.

Figure 11:
FIG. 11 depicts screen shots of an exemplary interactive video/multimedia presentation comprising a chapter navigation user-interaction element.

FIG. 11 depicts screen shots of an RMI presentation in which forty chapters of a movie as shown as a plurality of "live chapter" selectable regions (hotspots) 1110 that, when selected by a user, cause full size videos of the corresponding chapter to be displayed. The RMI presentation depicted in FIG. 11 was constructed using the RMI schema taught herein.

Figure 12A:
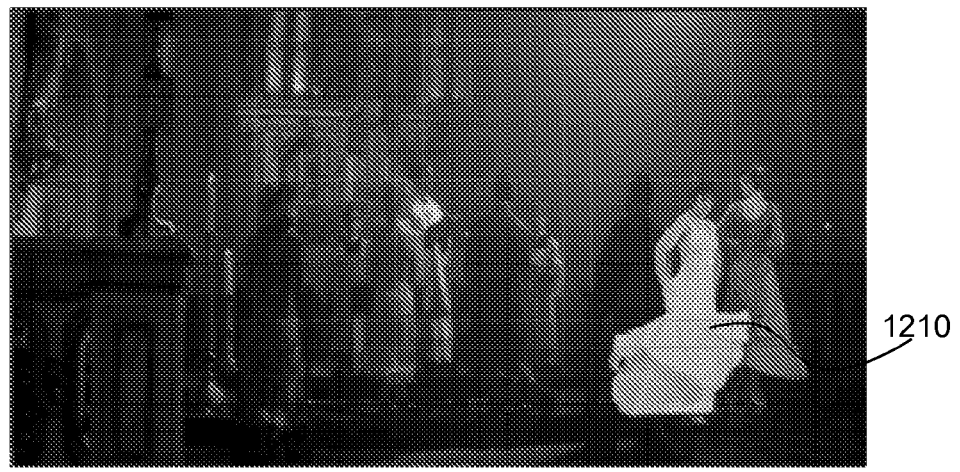
FIGS. 12A, 12B, and 12C depict screen shots of exemplary interactive video/multimedia presentations comprising interactive video objects.
Figure 12B:
Figure 12C:
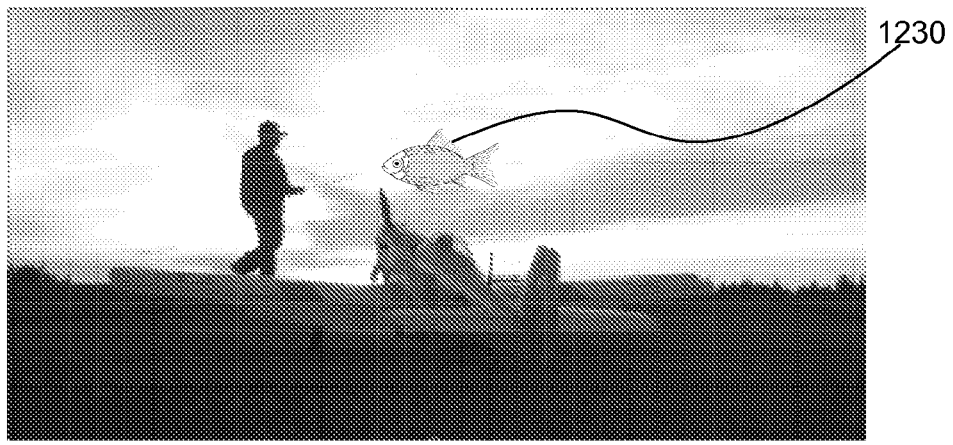

FIGS. 12A, 12B, and 12C depict screen shots of an RMI presentation comprising interactive video object overlay elements 1210, 1220, and 1230. Some of the objects 1210, 1220, and/or 1230 may be selected by a user. Selection of the objects 1210, 1220, and/or 1230 may cause modifications to the RMI presentation, such as enabling/disabling various elements of the RMI presentation, playback of additional elements, element animation and/or movement, replacement of a background region, or the like. Video objects, such as the objects 1210, 1220, and/or 1230 may be pasted into new scenes and blended to appear as normal part of this scene yet still remain selectable. Clicking within on a background region of a scene (a hotspot or ROI within the scene background) may cause a video object that was not previously visible to be displayed.

Figure 13A:
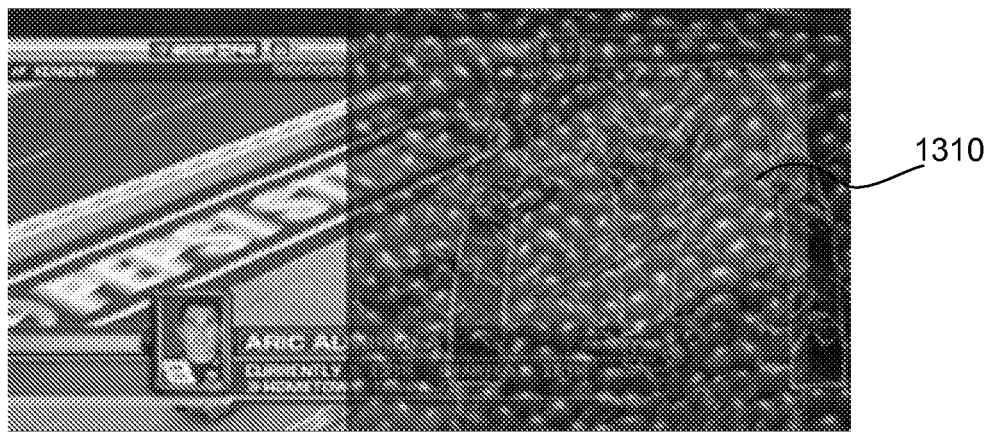
FIGS. 13A, 13B, and 13C depict screen shots of an exemplary interactive video/multimedia presentations comprising interactive advertising.
Figure 13B:
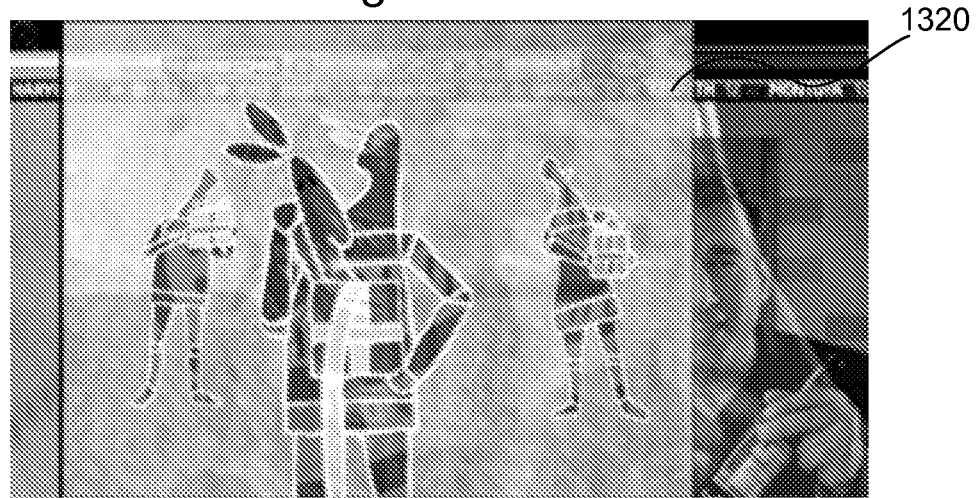
Figure 13C:

FIGS. 13A, 13B, and 13C depict screen shots of RMI presentation scenes comprising advertising multimedia elements 1310, 1320, and 1330 inserted therein. The advertisement multimedia elements 1310, 1320, and/or 1330 may be interactive. For example, an interactivity icon (not shown) may be provided on one or more of the display areas. Selection of the icon may trigger the display of an advertising multimedia element 1310, 1320, and/or 1330. Alternatively, the display of an advertising multimedia element 1310, 1320, and/or 1330 may be triggered automatically (e.g., according to embedded ROI content-aware metadata or the like). In some embodiments, the advertisement multimedia elements 1310, 1320, and/or 1330 may be dismissed by selecting an area within the advertising image overlay (e.g., a hotspot on the image). As shown in FIG. 13, the advertisement multimedia elements 1310, 1320, and/or 1330 may be semi-transparent, to allow other programming to be viewed concurrently with the advertising (e.g., viewed concurrently with a first content asset).

Various aspects of the disclosure may include a multimedia/video browsing system (as compared to HTML, a text based browsing system with multimedia additions) that allows for browsing content on an object and/or ROI basis (e.g., via the hotspots embedded within the content). An interactive video/multimedia presentation (as defined by IVMA data) may be presented using a standalone client application (e.g., on a user's laptop, PC, mobile phone or portable device (PMP)) and/or may be presented in conjunction with a server, such as a web server (e.g., run remotely within a portal-type application).

Another aspect of the disclosure may include an Advanced Multimedia Authoring Language for defining an interactive video/multimedia presentation. The language may work with compressed or uncompressed content and may provide mechanisms for advanced rendering, composition and interactivity. The RMI schema disclosed herein is one example of such a language.

In one embodiment, IVMA data may be created with a text editor or other authoring tool comprising a GUI, IDE, or the like. The IVMA data may be interpreted by a conforming playback device or application that implements the IVMA schema (e.g., interprets the IVMA data, requests content assets, renders and composes assets, and provides for user interaction according to the IVMA data).

IVMA data may be transmitted to a client as a standalone file or stream. Alternatively, IVMA data may be segmented and embedded in raw video frames, or in a compressed video stream of a video (or audio) codec.

A binary compressed representation of IVMA data may allow for efficient storage or transmission of the presentation. The presentation, whether, for example, in human readable format, such as XML or in machine readable binary format, may be transmitted in its entirety at one time or distributed throughout content, such as video or audio.

In one embodiment, an interactive video/multimedia presentation (as defined by IVMA data) combines interactivity, scalability and object/region of interest (ROI) based features. Integration of JavaScript® programming language and/or ECMAScript® programming language may be provided in the IVMA data to provide additional flexibility for animation as well as dynamic changes initiated by a user or otherwise. For example the JavaScript® programming language and/or ECMAScript® programming language may allow a user to interact with 3-D models (or other multimedia elements) within the IVM application.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a computer-readable medium having stored thereon instructions that may be used to program a computer (or other electronic device) to perform processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc. that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a datastore record may be resident in the same memory device, or across several memory devices, and may be linked together in fields of a record in a datastore across a network.

It will be understood by those having skill in the art that many changes may be made to the details of the above-described embodiments without departing from the underlying principles of the invention. The scope of the present invention should, therefore, be determined only by the following claims.

What is claimed is:

1. An apparatus, comprising:
processing logic to automatically detect an object in at least a portion of at least one image frame of video content, and to associate metadata corresponding to the detected object with the image frame, wherein the metadata associates at least one multimedia element with the detected object, wherein the metadata is embedded with the at least one image frame to tightly couple the metadata to the at least one image frame to provide for metadata-to-content synchronization that is independent of playback performance, playback timing, and user interaction, and wherein upon rendering of the image frame, the multimedia element is to be overlaid on the detected object based on the metadata; and
memory coupled to the processing logic, the memory to store the image frame.

2. The apparatus of claim 1, wherein the multimedia element is to provide for user interactivity based on the metadata.

3. The apparatus of claim 2, wherein to provide for user interactivity the multimedia element is to provide a user interface element.

4. The apparatus of claim 1, wherein to automatically detect an object comprises to automatically detect at least one of a shape, an object, a texture, an edge, or text.

5. The apparatus of claim 1, wherein the metadata comprises at least one of a region of interest (ROI) bounding the detected object, a location of the detected object in the image frame, at least one foreground region in the image frame, or at least one background region in the image frame.

6. The apparatus of claim 1, wherein the multimedia element comprises at least one of video content, audio content, or graphical content; wherein the graphical content comprises at least one of an image, text, a rendered two-dimensional graphic, or a rendered three-dimensional graphic.

7. The apparatus of claim 1, wherein the processing logic comprises at least one of a processor, a preprocessor, a computing device, a mobile computing device, a cell phone, a smart phone, a portable media player, a personal computer, a set top box, or a display device.

8. The apparatus of claim 1, further comprising a display device to display the multimedia object overlaid on the detected object.

9. A method comprising, at a processor:
automatically detecting an object in at least a portion of at least one image frame of video content;
associating metadata corresponding to the detected object with the image frame by embedding the metadata with the at least one image frame to tightly couple the metadata to the at least one image frame to provide for metadata-to-content synchronization that is independent of playback performance, playback timing, and user interaction, wherein the metadata associates at least one multimedia element with the detected object, and wherein upon rendering of the image frame, the multimedia element is to be overlaid on the detected object based on the metadata.

10. The method of claim 9, wherein the multimedia element is to provide for user interactivity based on the metadata.

11. The method of claim 10, wherein to provide for user interactivity the multimedia element is to provide a user interface element.

12. The method of claim 9, wherein to automatically detect an object comprises to automatically detect at least one of a shape, an object, a texture, an edge, or text.

13. The method of claim 9, wherein the metadata comprises at least one of a region of interest (ROI) bounding the detected object, a location of the detected object in the image frame, at least one foreground region in the image frame, or at least one background region in the image frame.

14. The method of claim 9, wherein the multimedia element comprises at least one of video content, audio content, or graphical content; wherein the graphical content comprises at least one of an image, text, a rendered two-dimensional graphic, or a rendered three-dimensional graphic.

15. The method of claim 9, further comprising displaying the multimedia object overlaid on the detected object.

16. One or more non-transitory computer readable media comprising instructions to cause an apparatus, upon execution of the instructions by the apparatus, to:
automatically detecting an object in at least a portion of at least one image frame of video content;
associating metadata corresponding to the detected object with the image frame by embedding the metadata with the at least one image frame to tightly couple the metadata to the at least one image frame to provide for metadata-to-content synchronization that is independent of playback performance, playback timing, and user interaction, wherein the metadata associates at least one multimedia element with the detected object, and wherein upon rendering of the image frame, the multimedia element is to be overlaid on the detected object based on the metadata.

17. The one or more computer readable media of claim 16, wherein the multimedia element is to provide a user interface element based on the metadata.

18. The one or more computer readable media of claim 16, wherein to automatically detect an object comprises to automatically detect at least one of a shape, an object, a texture, an edge, or text.

19. The one or more computer readable media of claim 16, wherein the metadata comprises at least one of a region of interest (ROI) bounding the detected object, a location of the detected object in the image frame, at least one foreground region in the image frame, or at least one background region in the image frame.

20. The one or more computer readable media of claim 16, wherein the multimedia element comprises at least one of video content, audio content, or graphical content; wherein the graphical content comprises at least one of an image, text, a rendered two-dimensional graphic, or a rendered three-dimensional graphic.

* * * * *